United States Patent
Qiu et al.

(10) Patent No.: US 12,236,108 B2
(45) Date of Patent: Feb. 25, 2025

(54) PROCESSOR, SIGNAL ADJUSTMENT METHOD AND COMPUTER SYSTEM

(71) Applicant: HUAWEI TECHNOLOGIES CO., LTD., Shenzhen (CN)

(72) Inventors: Liangen Qiu, Hangzhou (CN); Baoyao Yang, Hangzhou (CN); Binyang Gong, Hangzhou (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 101 days.

(21) Appl. No.: 18/160,164

(22) Filed: Jan. 26, 2023

(65) Prior Publication Data

US 2023/0176751 A1    Jun. 8, 2023

Related U.S. Application Data

(63) Continuation of application No. PCT/CN2021/108763, filed on Jul. 27, 2021.

(30) Foreign Application Priority Data

Jul. 29, 2020 (CN) .......................... 202010745753.0

(51) Int. Cl.
*G06F 1/04* (2006.01)
*G06F 1/12* (2006.01)
(Continued)

(52) U.S. Cl.
CPC .......... *G06F 3/0619* (2013.01); *G06F 3/0629* (2013.01); *G06F 3/0673* (2013.01)

(58) Field of Classification Search
CPC ..... G06F 3/0619; G06F 3/0629; G06F 3/0673
See application file for complete search history.

(56) References Cited

U.S. PATENT DOCUMENTS 5,353,423 A     10/1994  Hamid et al.
7,031,258 B1 *  4/2006   Frisch ................... H04L 47/431
                                                            370/235
(Continued)

FOREIGN PATENT DOCUMENTS

CN    101401165 B    8/2012
CN    102667732 A    9/2012
(Continued)

OTHER PUBLICATIONS

Luo Jun, "Principle and Development: Based on TI Da Vinci DM8168 Series", Embedded Digital Media Processor, Total 1 page (Jun. 1, 2016).

*Primary Examiner* — Mohammed H Rehman
(74) *Attorney, Agent, or Firm* — Leydig, Voit & Mayer, Ltd.

(57) ABSTRACT

A processor, a signal adjustment method, and a computer system including the processor are provided, pertaining to the field of computer technologies. The processor includes a memory controller. The memory controller includes a memory physical interface and a first processor core, and the first processor core is connected to the memory physical interface. After the computer system is started and during a running process of the computer system, the first processor core is configured to adjust a timing relationship between a target signal of the memory physical interface and a synchronization signal of the target signal. According to this application, timing alignment can be ensured between the target signal and the synchronization signal, thereby improving correctness of sampling performed on the target signal.

20 Claims, 10 Drawing Sheets

(51) Int. Cl.
   *G06F 3/06* (2006.01)
   *G06F 5/06* (2006.01)

(56) References Cited

U.S. PATENT DOCUMENTS

| | | | |
|---|---|---|---|
| 7,123,051 B1* | 10/2006 | Lee | H03K 19/1776 |
| | | | 365/233.17 |
| 9,582,356 B1* | 2/2017 | Liu | G06F 13/1668 |
| 9,665,289 B1 | 5/2017 | Mach et al. | |
| 9,965,409 B2 | 5/2018 | Hsu et al. | |
| 10,719,058 B1* | 7/2020 | Johnson | G06F 13/1694 |
| 2010/0205386 A1 | 8/2010 | Yamashita | |
| 2012/0257459 A1 | 10/2012 | Berke | |
| 2012/0310621 A1 | 12/2012 | Jeong et al. | |
| 2013/0064025 A1* | 3/2013 | Chen | G06F 13/1689 |
| | | | 365/193 |
| 2015/0378603 A1 | 12/2015 | Dearth et al. | |
| 2018/0062883 A1* | 3/2018 | Duan | H04L 7/002 |
| 2018/0088862 A1* | 3/2018 | Covington | G11C 29/026 |
| 2019/0080730 A1 | 3/2019 | Lee et al. | |

FOREIGN PATENT DOCUMENTS

| | | |
|---|---|---|
| CN | 102999454 A | 3/2013 |
| CN | 103324585 A | 9/2013 |
| CN | 102498520 B | 11/2014 |
| CN | 106133710 A | 11/2016 |
| CN | 110447075 A | 11/2019 |
| CN | 111161766 A | 5/2020 |

\* cited by examiner

PROCESSOR, SIGNAL ADJUSTMENT METHOD AND COMPUTER SYSTEM

CROSS-REFERENCE TO RELATED APPLICATIONS

This application is a continuation of International Application No. PCT/CN2021/108763, filed on Jul. 27, 2021, which claims priority to Chinese Patent Application No. 202010745753.0, filed on Jul. 29, 2020. The disclosures of the aforementioned applications are hereby incorporated by reference in their entireties.

TECHNICAL FIELD

Embodiments of this application relate to the field of computer technologies, and in particular, to a processor, a signal adjustment method, and a computer system.

BACKGROUND

A computer system usually includes a processor and a memory chip. The processor includes a memory controller. The memory controller includes a memory physical interface. The memory physical interface is configured to transmit signals between the processor and the memory chip. Memory interface signals are signals transmitted between the processor and the memory chip by using the memory physical interface. The memory interface signals may include a target signal and a synchronization signal of the target signal.

In a process of starting the computer system, memory training may be performed on the computer system to adjust a timing relationship between the target signal and the synchronization signal of the target signal and achieve timing alignment between the target signal and the synchronization signal. In this way, maximization of a sampling window of the target signal is ensured, and correct sampling of the target signal is ensured. For example, the target signal is a data (DQ) signal, and a synchronization signal of the DQ signal is a bidirectional data strobe (DQS) signal. Memory training may be performed on the computer system to adjust a timing relationship between the DQ signal and the DQS signal, so that a sampling edge of the DQS signal is aligned with a center position of the DQ signal, thereby ensuring maximization of a sampling window of the DQ signal.

However, in a running process of the computer system after the computer system is started, due to adverse impact of an external factor such as a power supply voltage or an ambient temperature, a delay of a memory interface signal may change. The timing relationship between the target signal and the synchronization signal of the target signal, obtained through training in the process of starting the computer system, changes consequently, and correctness of sampling performed on the target signal is affected.

SUMMARY

This application provides a processor, a signal adjustment method, and a computer system, to help ensure timing alignment between a target signal of a memory physical interface and a synchronization signal of the target signal and therefore help improve correctness of sampling performed on the target signal. The technical solutions of this application are as follows:

According to one aspect, a processor is provided and includes a memory controller, where the memory controller includes a memory physical interface and a first processor core, and the first processor core is connected to the memory physical interface; and in a running process of a computer system including the processor after the computer system is started, the first processor core is configured to adjust a timing relationship between a target signal of the memory physical interface and a synchronization signal of the target signal, where both the target signal and the synchronization signal are signals transmitted by using the memory physical interface.

In the technical solution provided by this application, in the running process of the computer system including the processor after the computer system is started, the first processor core in the memory controller of the processor can adjust the timing relationship between the target signal of the memory physical interface of the processor and the synchronization signal of the target signal. This helps ensure timing alignment between the target signal and the synchronization signal and therefore helps ensure correctness and reliability of sampling performed on the target signal.

Optionally, in the running process of the computer system after the computer system is started, when a training condition is met, the first processor core is specifically configured to adjust the timing relationship between the target signal and the synchronization signal through memory training.

In the technical solution provided by this application, the first processor core adjusts the timing relationship between the target signal and the synchronization signal of the target signal through memory training. This helps ensure timing alignment between the target signal and the synchronization signal of the target signal.

Optionally, the training condition includes at least one of the following: duration from previous memory training reaches first preset duration; a delay variation detected by a delay detection circuit on a memory chip connected to the processor is greater than a preset variation; and duration in which the memory chip connected to the processor is in an idle state reaches second preset duration.

Optionally, in the running process of the computer system after the computer system is started, the first processor core is specifically configured to adjust the timing relationship between the target signal and the synchronization signal through memory training based on an initial training result, where the initial training result is a training result obtained by performing memory training on the computer system before current memory training is performed.

In the technical solution provided by this application, the first processor core adjusts the timing relationship between the target signal and the synchronization signal through memory training based on the initial training result. This helps reduce an amount of computation in performing memory training by the first processor core and reduce time consumption in adjusting the timing relationship between the target signal and the synchronization signal by the first processor core.

Optionally, the initial training result includes an initial left boundary and an initial right boundary of a sampling window of the target signal; and the first processor core is specifically configured to adjust the timing relationship between the target signal and the synchronization signal through memory training based on the initial training result by performing the following training step, where the training step includes: determining a target left boundary of the sampling window of the target signal based on the initial left boundary; determining a target right boundary of the sampling window of the target signal based on the initial right boundary; and determining a target center position of the sampling window of the target signal based on the target left boundary and the target right boundary.

In the technical solution provided by this application, the first processor core determines the target left boundary based on the initial left boundary and determines the target right boundary based on the initial right boundary. This helps reduce a delay value that needs to be tested for determining the target left boundary and the target right boundary by the first processor core and reduce time consumption in determining the target left boundary and the target right boundary by the first processor core.

Optionally, the determining a target left boundary of the sampling window of the target signal based on the initial left boundary includes: performing a read/write test of the target signal based on the initial left boundary; and if the read/write test succeeds, adjusting the left boundary of the sampling window to the left by a target step length, and performing a read/write test of the target signal based on an adjusted left boundary, until the read/write test fails; and determining a left boundary previous to a left boundary at which the read/write test fails, as the target left boundary of the sampling window; or if the read/write test fails, adjusting the left boundary of the sampling window to the right by a target step length, and performing a read/write test of the target signal based on an adjusted left boundary, until the read/write test fails; and determining a left boundary previous to a left boundary at which the read/write test fails, as the target left boundary of the sampling window.

Optionally, the determining a target right boundary of the sampling window of the target signal based on the initial right boundary includes: performing a read/write test of the target signal based on the initial right boundary; and if the read/write test succeeds, adjusting the right boundary of the sampling window to the right by a target step length, and performing a read/write test of the target signal based on an adjusted right boundary, until the read/write test fails; and determining a right boundary previous to a right boundary at which the read/write test fails, as the target right boundary of the sampling window; or if the read/write test fails, adjusting the right boundary of the sampling window to the left by a target step length, and performing a read/write test of the target signal based on an adjusted right boundary, until the read/write test fails; and determining a right boundary previous to a right boundary at which the read/write test fails, as the target right boundary of the sampling window.

Optionally, the memory physical interface includes a shadow register corresponding to the target signal and a transition register corresponding to the target signal, and either of the left boundary and the right boundary of the sampling window corresponds to one delay value; the first processor core is further configured to: before performing each read/write test of the target signal, configure, in the transition register corresponding to the target signal, a delay value corresponding to a boundary of the sampling window based on which the current read/write test is performed; and when performing each read/write test of the target signal, load the delay value in the transition register corresponding to the target signal into the shadow register corresponding to the target signal; and correspondingly, the first processor core is specifically configured to perform the read/write test of the target signal based on the delay value that is in the shadow register corresponding to the target signal and that corresponds to the boundary of the sampling window when the current read/write test of the target signal is performed.

In the technical solution provided by this application, before performing the read/write test of the target signal, the first processor core configures, in the transition register, the delay value corresponding to the boundary of the sampling window; and when performing the read/write test of the target signal, the first processor core only needs to load the delay value in the transition register into the shadow register. This helps reduce time consumption in configuring the delay value in the shadow register by the first processor core and reduce adverse impact of a process of performing memory training by the first processor core on performance of the processor.

Optionally, the memory physical interface includes the shadow register corresponding to the target signal, the initial training result further includes an initial center position of the sampling window of the target signal, the initial center position corresponds to one delay value, and before the first processor core performs the training step, the delay value corresponding to the initial center position is in the shadow register; and after determining the target center position of the sampling window of the target signal, the first processor core is further configured to update the delay value in the shadow register by using a delay value corresponding to the target center position.

In the technical solution provided by this application, after determining the target center position, the first processor core updates the delay value in the shadow register by using the delay value corresponding to the target center position. Therefore, it can be convenient for the processor to subsequently use the delay value corresponding to the target center position to perform data read/write.

Optionally, after determining the target left boundary and the target right boundary of the sampling window of the target signal, the first processor core is further configured to store, in a non-volatile memory connected to the processor, a delay value corresponding to the target left boundary and a delay value corresponding to the target right boundary. The non-volatile memory may be a flash memory, a serial advanced technology attachment (SATA) hard disk, a solid state drive (SSD) hard disk, a magnetic disk, or the like.

In the technical solution provided by this application, after determining the target left boundary and the target right boundary of the sampling window of the target signal, the first processor core stores, in the non-volatile memory, the delay value corresponding to the target left boundary and the delay value corresponding to the target right boundary. Therefore, it can be convenient for the first processor core to subsequently use the target left boundary as the initial left boundary and use the target right boundary as the initial right boundary to perform memory training on the computer system, and it can be ensured that when the computer system is powered off, the delay value corresponding to the target left boundary and the delay value corresponding to the target right boundary are not lost.

Optionally, the processor further includes a second processor core, the second processor core may be a master processor core of the processor, and the first processor core may be a slave processor core of the processor; before adjusting the timing relationship between the target signal and the synchronization signal of the target signal, the first processor core is further configured to send a pause signal to the second processor core; and when receiving the pause signal, the second processor core is configured to stop sending a read/write instruction to the memory chip connected to the processor.

In the technical solution provided by this application, before adjusting the timing relationship between the target signal and the synchronization signal of the target signal, the first processor core sends the pause signal to the second processor core; and when receiving the pause signal, the second processor core stops sending the read/write instruction to the memory chip connected to the processor. Therefore, in the process in which the first processor core adjusts the timing relationship between the target signal and the synchronization signal, the second processor core does not send the read/write instruction to the memory chip. This helps avoid an error in a data read/write process of the second processor core.

Optionally, after adjusting the timing relationship between the target signal and the synchronization signal, the first processor core is further configured to send a resume signal to the second processor core; and when receiving the resume signal, the second processor core is further configured to resume sending the read/write instruction to the memory chip connected to the processor.

In the technical solution provided by this application, after adjusting the timing relationship between the target signal and the synchronization signal, the first processor core sends the resume signal to the second processor core, so that the second processor core resumes sending the read/write instruction to the memory chip connected to the processor. This helps the second processor core perform data read/write.

Optionally, before sending the pause signal to the second processor core, the first processor core is further configured to back up an operating parameter of the second processor core.

In the technical solution provided by this application, before sending the pause signal to the second processor core, the first processor core backs up the operating parameter of the second processor core. Therefore, it is convenient for the second processor core to restore the operating parameter of the second processor core after the second processor core receives the resume signal sent by the first processor core, and it is convenient for the second processor core to continue to perform data read/write.

Optionally, the memory physical interface includes the transition register corresponding to the target signal; and before sending the pause signal to the second processor core, the first processor core is specifically configured to back up the operating parameter of the second processor core to the transition register.

In the technical solution provided by this application, before sending the pause signal to the second processor core, the first processor core backs up the operating parameter of the second processor core to the transition register corresponding to the target signal. Therefore, it can be convenient for the first processor core to quickly back up the operating parameter of the second processor core.

Optionally, the first processor core is specifically configured to: before performing the read/write test of the target signal, send the pause signal to the second processor core; and after performing n read/write tests of the target signal, send the resume signal to the second processor core, where n≥1, and n is an integer.

In the technical solution provided by this application, before performing the read/write test of the target signal, the first processor core sends the pause signal to the second processor core, so that the second processor core pauses sending the read/write instruction to the memory chip; and after performing the n read/write tests of the target signal, the first processor core sends the resume signal to the second processor core, so that the second processor core resumes sending the read/write instruction to the memory chip. Therefore, the first processor core can divide the entire memory training process into a plurality of stages. This avoids adverse impact of relatively long time consumption in the memory training process on performance of the processor.

Optionally, the initial training result further includes the initial center position of the sampling window of the target signal, the initial center position corresponds to one delay value, and before the first processor core performs the training step, the delay value corresponding to the initial center position is stored in the shadow register corresponding to the target signal; the operating parameter of the second processor core may include one delay value corresponding to the initial center position; before sending the pause signal to the second processor core, the first processor core is specifically configured to back up the delay value that is in the shadow register and that corresponds to the initial center position; and after performing the n read/write tests of the target signal and before sending the resume signal to the second processor core, the first processor core is further configured to load, into the shadow register, the delay value that is backed up and that corresponds to the initial center position.

In the technical solution provided by this application, before sending the pause signal to the second processor core, the first processor core backs up the delay value corresponding to the initial center position, and after performing the n read/write tests and before sending the resume signal to the second processor core, the first processor core loads, into the shadow register, the delay value that is backed up and that corresponds to the initial center position. Therefore, it can be convenient for the second processor core to resume the data read/write process, and inability of the second processor core to continue to perform data read/write due to the memory training process can be avoided.

Optionally, the first processor core is specifically configured to: before sending the pause signal to the second processor core, back up, to the transition register, the delay value that is in the shadow register and that corresponds to the initial center position; and after performing the n read/write tests of the target signal and before sending the resume signal to the second processor core, load, into the shadow register, the delay value that is backed up in the transition register and that corresponds to the initial center position.

In the technical solution provided by this application, the first processor core can use the transition register to back up the delay value corresponding to the initial center position. Therefore, inability of the second processor core to continue to perform data read/write due to the memory training process can be avoided.

Optionally, the memory controller further includes a storage circuit, where the storage circuit is connected to the first processor core; the processor further includes the second processor core; the second processor core is configured to write call information to the storage circuit, where the call information is information used to adjust the timing relationship between the target signal and the synchronization signal; and in the running process of the computer system after the computer system is started, the first processor core is specifically configured to read the call information from the storage circuit and execute an instruction in the call information. The second processor core may be the master processor core of the processor, and the first processor core may be the slave processor core of the processor. The first processor core may be a logic circuit (or module) having a logic computing capability, and can adjust the timing relationship between the target signal and the synchronization signal of the target signal based on a call by the second processor core. Optionally, the storage circuit includes at least one of a register (REG) and a static random access memory (SRAM).

Optionally, firmware of the first processor core is stored in the non-volatile memory connected to the processor and is updatable, and the firmware includes the call information.

In the technical solution provided by this application, the firmware of the first processor core includes the call information, and the firmware of the first processor core is updatable. Therefore, the call information can be updated by updating the firmware, for example, by adding, removing, or modifying instructions in the call information, so that extension of memory training and flexible configuration can be implemented.

Optionally, the memory controller includes at least one memory channel and at least one first processor core, where each memory channel includes the memory physical interface, the memory physical interface in each memory channel is connected to at least one memory chip, and the memory physical interface in the at least one memory channel is connected to the at least one first processor core; and in the running process of the computer system after the computer system is started, the at least one first processor core is configured to adjust the timing relationship between the target signal of the memory physical interface in the at least one memory channel and the synchronization signal of the target signal.

In the technical solution provided by this application, the memory physical interface in the at least one memory channel is connected to the at least one first processor core. Therefore, the at least one first processor core can be used to adjust the timing relationship between the target signal of the memory physical interface in the memory channel and the synchronization signal of the target signal by performing memory training on the at least one memory channel.

Optionally, the at least one memory channel is in a one-to-one correspondence with the at least one first processor core, and the memory physical interface in each memory channel is connected to the corresponding first processor core; and in the running process of the computer system after the computer system is started, each first processor core is configured to adjust the timing relationship between the target signal of the memory physical interface in the corresponding memory channel and the synchronization signal.

In the technical solution provided by this application, the at least one memory channel is in a one-to-one correspondence with the at least one first processor core. Therefore, memory training is performed based on the one-to-one correspondence between the at least one first processor core and the at least one memory channel to adjust the timing relationship between the target signal of the memory physical interface in the corresponding memory channel and the synchronization signal of the target signal.

Optionally, when the target signal is a DQ signal or a data mask (DM) signal, the synchronization signal is a DQS signal; or when the target signal is a control (CTL) signal or a command (CMD) signal, the synchronization signal is a clock (CK) signal.

According to another aspect, a signal adjustment method is provided and applied to a processor, where the processor includes a memory controller, the memory controller includes a memory physical interface and a first processor core, the first processor core is connected to the memory physical interface, and the method includes: in a running process of a computer system including the processor after the computer system is started, the first processor core adjusts a timing relationship between a target signal of the memory physical interface and a synchronization signal of the target signal, where both the target signal and the synchronization signal are signals transmitted by using the memory physical interface.

Optionally, that the first processor core adjusts a timing relationship between a target signal of the memory physical interface and a synchronization signal of the target signal in a running process of a computer system including the processor after the computer system is started includes: in the running process of the computer system after the computer system is started, when a training condition is met, the first processor core adjusts the timing relationship between the target signal and the synchronization signal through memory training.

Optionally, the training condition includes at least one of the following: duration from previous memory training reaches first preset duration; a delay variation detected by a delay detection circuit on a memory chip connected to the processor is greater than a preset variation; and duration in which the memory chip connected to the processor is in an idle state reaches second preset duration.

Optionally, that the first processor core adjusts a timing relationship between a target signal of the memory physical interface and a synchronization signal of the target signal in a running process of a computer system including the processor after the computer system is started includes: in the running process of the computer system after the computer system is started, the first processor core adjusts the timing relationship between the target signal and the synchronization signal through memory training based on an initial training result, where the initial training result is a training result obtained by performing memory training on the computer system before current memory training is performed.

Optionally, the initial training result includes an initial left boundary and an initial right boundary of a sampling window of the target signal; and that the first processor core adjusts the timing relationship between the target signal and the synchronization signal through memory training based on an initial training result includes: the first processor core adjusts the timing relationship between the target signal and the synchronization signal through memory training based on the initial training result by performing the following training step, where the training step includes: determining a target left boundary of the sampling window of the target signal based on the initial left boundary; determining a target right boundary of the sampling window of the target signal based on the initial right boundary; and determining a target center position of the sampling window of the target signal based on the target left boundary and the target right boundary.

Optionally, the determining a target left boundary of the sampling window of the target signal based on the initial left boundary includes: performing a read/write test of the target signal based on the initial left boundary; and if the read/write test succeeds, adjusting the left boundary of the sampling window to the left by a target step length, and performing a read/write test of the target signal based on an adjusted left boundary, until the read/write test fails; and determining a left boundary previous to a left boundary at which the read/write test fails, as the target left boundary of the sampling window; or if the read/write test fails, adjusting the left boundary of the sampling window to the right by a target step length, and performing a read/write test of the target signal based on an adjusted left boundary, until the read/write test fails; and determining a left boundary previous to a left boundary at which the read/write test fails, as the target left boundary of the sampling window.

Optionally, the determining a target right boundary of the sampling window of the target signal based on the initial right boundary includes: performing a read/write test of the target signal based on the initial right boundary; and if the read/write test succeeds, adjusting the right boundary of the sampling window to the right by a target step length, and performing a read/write test of the target signal based on an adjusted right boundary, until the read/write test fails; and determining a right boundary previous to a right boundary at which the read/write test fails, as the target right boundary of the sampling window; or if the read/write test fails, adjusting the right boundary of the sampling window to the left by a target step length, and performing a read/write test of the target signal based on an adjusted right boundary, until the read/write test fails; and determining a right boundary previous to a right boundary at which the read/write test fails, as the target right boundary of the sampling window.

Optionally, the memory physical interface includes a shadow register corresponding to the target signal and a transition register corresponding to the target signal, and either of the left boundary and the right boundary of the sampling window corresponds to one delay value; the method further includes: before performing each read/write test of the target signal, the first processor core configures, in the transition register, a delay value corresponding to a boundary of the sampling window based on which the current read/write test is performed; and when performing each read/write test of the target signal, the first processor core loads the delay value in the transition register corresponding to the target signal into the shadow register corresponding to the target signal; and correspondingly, that the first processor core performs a read/write test of the target signal includes: the first processor core performs the read/write test of the target signal based on the delay value that is in the shadow register corresponding to the target signal and that corresponds to the boundary of the sampling window when the current read/write test of the target signal is performed.

Optionally, the memory physical interface includes the shadow register corresponding to the target signal, the initial training result further includes an initial center position of the sampling window of the target signal, the initial center position corresponds to one delay value, and before the first processor core performs the training step, the delay value corresponding to the initial center position is in the shadow register; and the method further includes: after determining the target center position of the sampling window of the target signal, the first processor core updates the delay value in the shadow register by using a delay value corresponding to the target center position.

Optionally, the method further includes: after determining the target left boundary and the target right boundary of the sampling window of the target signal, the first processor core stores, in a non-volatile memory connected to the processor, a delay value corresponding to the target left boundary and a delay value corresponding to the target right boundary. The non-volatile memory may be a flash memory, a SATA hard disk, an SSD hard disk, a magnetic disk, or the like.

Optionally, the processor further includes a second processor core, the second processor core may be a master processor core of the processor, and the first processor core may be a slave processor core of the processor; and the method further includes: before adjusting the timing relationship between the target signal and the synchronization signal, the first processor core sends a pause signal to the second processor core; and the second processor core stops, based on the received pause signal, sending a read/write instruction to the memory chip connected to the processor.

Optionally, the method further includes: after adjusting the timing relationship between the target signal and the synchronization signal, the first processor core sends a resume signal to the second processor core; and the second processor core resumes, based on the received resume signal, sending the read/write instruction to the memory chip connected to the processor.

Optionally, the method further includes: before sending the pause signal to the second processor core, the first processor core backs up an operating parameter of the second processor core.

Optionally, the memory physical interface includes the transition register corresponding to the target signal; and that the first processor core backs up an operating parameter of the second processor core before sending the pause signal to the second processor core includes: before sending the pause signal to the second processor core, the first processor core backs up the operating parameter of the second processor core to the transition register.

Optionally, that the first processor core sends a pause signal to the second processor core before adjusting the timing relationship between the target signal and the synchronization signal includes: before performing the read/write test of the target signal, the first processor core sends the pause signal to the second processor core; and that the first processor core sends a resume signal to the second processor core after adjusting the timing relationship between the target signal and the synchronization signal includes: after performing n read/write tests of the target signal, the first processor core sends the pause signal to the second processor core, where n 1, and n is an integer.

Optionally, the initial training result further includes the initial center position of the sampling window of the target signal, the initial center position corresponds to one delay value, and before the first processor core performs the training step, the delay value corresponding to the initial center position is stored in the shadow register corresponding to the target signal; the operating parameter of the second processor core may include one delay value corresponding to the initial center position; that the first processor core backs up an operating parameter of the second processor core before sending the pause signal to the second processor core includes: before sending the pause signal to the second processor core, the first processor core backs up the delay value that is in the shadow register and that corresponds to the initial center position; and the method further includes: after performing the n read/write tests of the target signal and before sending the resume signal to the second processor core, the first processor core loads, into the shadow register, the delay value that is backed up and that corresponds to the initial center position.

Optionally, that the first processor core backs up the delay value that is stored in the shadow register and that corresponds to the initial center position before sending the pause signal to the second processor core includes: before sending the pause signal to the second processor core, the first processor core backs up, to the transition register, the delay value that is in the shadow register and that corresponds to the initial center position; and that the first processor core loads, into the shadow register, the delay value that is backed up and that corresponds to the initial center position after performing the n read/write tests of the target signal and before sending the resume signal to the second processor core includes: after performing the n read/write tests of the target signal and before sending the resume signal to the second processor core, the first processor core loads, into the shadow register, the delay value that is backed up in the transition register and that corresponds to the initial center position.

Optionally, the memory controller further includes a storage circuit, where the storage circuit is connected to the first processor core; the processor further includes the second processor core; the method further includes: the second processor core writes call information to the storage circuit, where the call information is information used to adjust the timing relationship between the target signal and the synchronization signal; and that the first processor core adjusts a timing relationship between a target signal of the memory physical interface and a synchronization signal of the target signal in a running process of a computer system including the processor after the computer system is started includes: in the running process of the computer system after the computer system is started, the first processor core reads the call information from the storage circuit and executes an instruction in the call information, to adjust the timing relationship between the target signal of the memory physical interface and the synchronization signal of the target signal. The storage circuit includes at least one of a REG and a SRAM.

Optionally, firmware of the first processor core is stored in the non-volatile memory connected to the processor and is updatable, and the firmware includes the call information.

Optionally, the memory controller includes at least one memory channel and at least one first processor core, where each memory channel includes the memory physical interface, the memory physical interface in each memory channel is connected to at least one memory chip, and the memory physical interface in the at least one memory channel is connected to the at least one first processor core; and in the running process of the computer system after the computer system is started, the at least one first processor core is configured to adjust the timing relationship between the target signal of the memory physical interface in the at least one memory channel and the synchronization signal of the target signal.

Optionally, the at least one memory channel is in a one-to-one correspondence with the at least one first processor core, and the memory physical interface in each memory channel is connected to the corresponding first processor core; and in the running process of the computer system after the computer system is started, each first processor core is configured to adjust the timing relationship between the target signal of the memory physical interface in the corresponding memory channel and the synchronization signal.

Optionally, when the target signal is a DQ signal or a DM signal, the synchronization signal is a DQS signal, or when the target signal is a CTL signal or a CMD signal, the synchronization signal is a CK signal.

It should be noted that for a technical effect of the signal adjustment method provided in the another aspect, refer to the technical effect of the processor provided in the one aspect. Details are not described herein again in this application.

According to still another aspect, a computer system is provided, where the computer system includes the processor according to the one aspect and a memory chip coupled to the processor. For example, the computer system may be a computer motherboard, or may be an electronic device such as a notebook computer, a mobile phone, or a digital camera.

The technical solutions provided in this application have the following beneficial effects:

In the processor, the signal adjustment method, and the computer system provided in this application, in the running process of the computer system including the processor after the computer system is started, the first processor core in the memory controller of the processor can adjust the timing relationship between the target signal of the memory physical interface and the synchronization signal of the target signal. This helps ensure timing alignment between the target signal and the synchronization signal and therefore helps ensure correctness and reliability of sampling performed on the target signal.

DESCRIPTION OF EMBODIMENTS

In a process of starting a computer system, various hardware modules (for example, a memory and a video card) in the computer system usually need to be initialized to ensure that the hardware modules in the computer can run stably. Memory initialization is an important step in the process of starting the computer system, and a memory initialization process usually includes memory detection, memory configuration, memory training, memory testing, and the like. The memory training is a most important step in the memory initialization process. The memory training includes adjusting a timing relationship between different memory interface signals based on adverse impact of different PCB layouts, temperatures, and voltages, to achieve timing alignment between the different memory interface signals, ensure timing margin of a memory physical interface and implement normal read and write. For example, a cycle of a DQS signal whose frequency is 6.4 GHz (gigahertz) is 0.3125 nanosecond; a DQ signal is sampled at both a rising edge and a falling edge of the DQS signal (that is, the DQ signal is sampled once in a half DQS cycle), but the DQ signal cannot be correctly sampled at every moment in the half DQS cycle. Therefore, a delay of the DQ signal can be adjusted through memory training, so that a sampling edge of the DQS signal is aligned with a center position of the DQ signal. In this way, maximization of a sampling window of the DQ signal is ensured, and the DQ signal can be correctly sampled in the half DQS cycle (0.1562 nanosecond). The sampling window includes a left boundary and a right boundary. The signal can be correctly sampled at any position between the left boundary and the right boundary. The signal cannot be correctly sampled at any position to the left of the left boundary or any position to the right of the right boundary.

Figure 1:
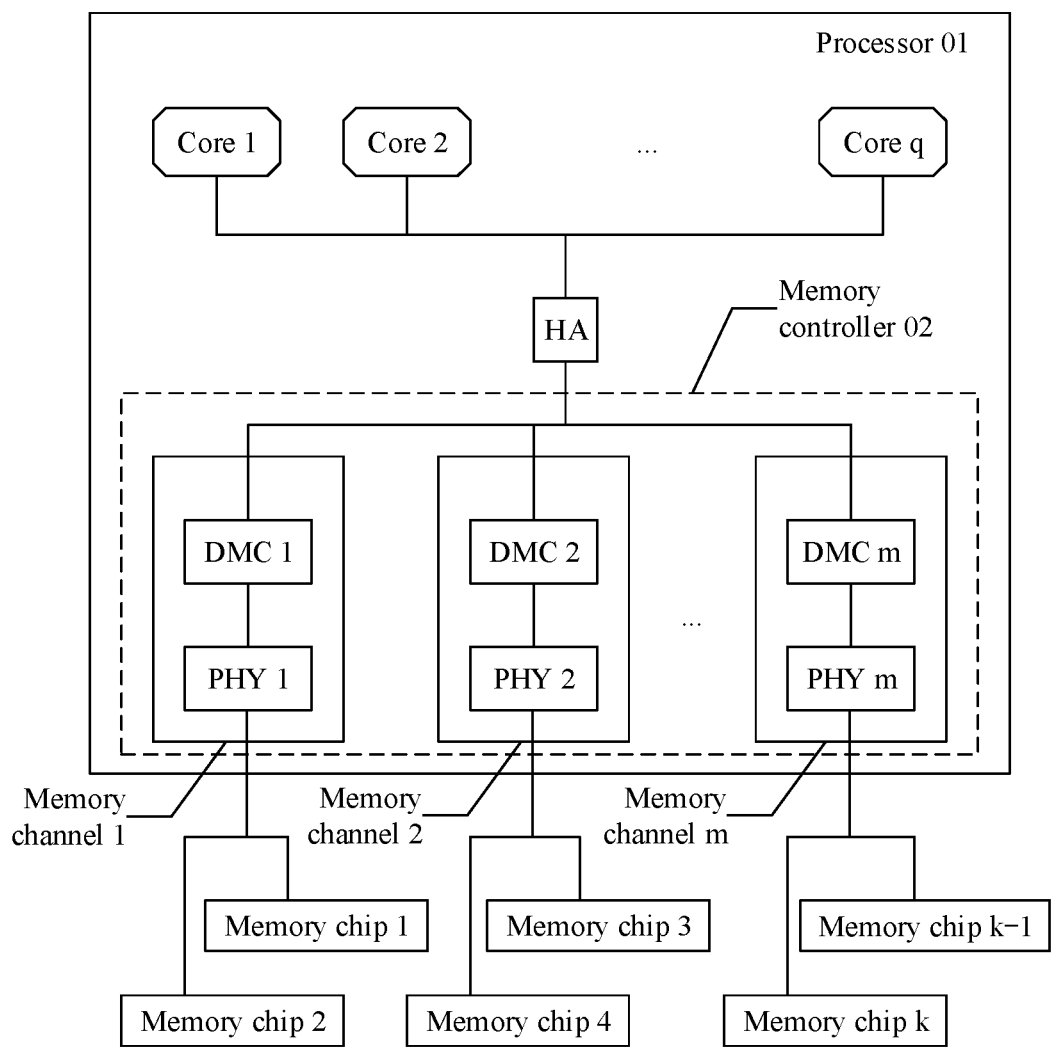
FIG. 1 is a schematic diagram of a structure of a computer system according to an embodiment of this application.

Usually, in the process of starting the computer system, a processor in the computer system, such as a central processing unit (CPU), may perform memory training on the computer system. For example, FIG. 1 is a schematic diagram of a structure of a computer system 00 according to an embodiment of this application. The computer system 00 includes a processor 01 and at least one memory chip. In FIG. 1, an example in which the at least one memory chip includes a memory chip 1 to a memory chip k (that is, the memory chip 1, memory chip 2, memory chip 3, . . . , memory chip k) is used for description, where k≥1, and k is an integer. In some scenarios, the memory chip may also be referred to as a memory module. This is not limited in this embodiment of this application.

As shown in FIG. 1, the processor 01 includes a memory controller 02 and q cores, where q≥1, and q is an integer. In FIG. 1, an example in which the q cores include a core 1 to a core q (that is, the core 1, core 2, core 3, . . . , core q) is used for description. Each core can implement a logical operation function. When q is greater than 1, the processor 01 may also be referred to as a multi-core processor. In this case, a plurality of cores in the processor 01 can perform parallel logical operations to increase an operation speed of the processor 01. The memory controller 02 can control the memory chip 1 to the memory chip k. For example, the memory controller 02 can perform read/write operations and refresh operations on the memory chip 1 to the memory chip k. For example, the memory controller 02 may be a double data rate (DDR) subsystem.

As shown in FIG. 1, the memory controller 02 includes m memory channels, where m≥1, and m is an integer. In FIG. 1, an example in which the m memory channels include a memory channel 1 to a memory channel m (that is, the memory channel 1, memory channel 2, . . . , memory channel m) is used for description. Each memory channel may correspond to at least one memory chip, and each memory channel may control the memory chip corresponding to the memory channel. For example, each memory channel corresponds to two memory chips or one memory chip. Optionally, each memory channel includes a DDR management controller (DMC) and a memory physical interface, where the memory physical interface may be a physical interface (PHY). The memory physical interface in each memory channel is connected to the memory chip corresponding to the memory channel. The DMC in each memory channel is separately connected to the cores 1–q and the memory physical interface in the memory channel. According to instructions sent by the cores 1–q, the DMC in each memory channel controls the corresponding memory chip by using the memory physical interface in the memory channel. For example, the DMC in each memory channel reads/writes data from/to the corresponding memory chip through the memory physical interface in the memory channel according to read/write requests sent by the cores 1–q.

An example in which each memory channel corresponds to two memory chips is used for description. As shown in FIG. 1, the memory channel 1 includes a DMC 1 and a PHY 1, where the PHY 1 is connected to the memory chip 1 and the memory chip 2 (the memory chip 1 and the memory chip 2 both correspond to the memory channel 1), the DMC 1 is separately connected to the PHY 1 and the cores 1–q, and the DMC 1 can read/write data from/to the memory chip 1 and the memory chip 2 through the PHY 1 according to read/write requests sent by the cores 1–q. The memory channel 2 includes a DMC 2 and a PHY 2, where the PHY 2 is connected to the memory chip 3 and the memory chip 4 (the memory chip 3 and the memory chip 4 both correspond to the memory channel 2), the DMC 2 is separately connected to the PHY 2 and the cores 1–q, and the DMC 2 can read/write data from/to the memory chip 3 and the memory chip 4 through the PHY 2 according to read/write requests sent by the cores 1–q. By analogy, the memory channel m includes a DMC m and a PHY m, where the PHY m is connected to the memory chip k–1 and the memory chip k (the memory chip k–1 and the memory chip k both correspond to the memory channel m), the DMC m is separately connected to the PHY m and the cores 1–q, and the DMC m can read/write data from/to the memory chip k–1 and the memory chip k through the PHY m according to read/write requests sent by the cores 1–q.

As shown in FIG. 1, the processor 01 further includes a home agent (HA) element. The HA element is located on a physical link between the cores 1–q and the DMCs 1–m. The cores 1–q may send read/write requests to the DMCs 1–m by using the HA element, so that the DMCs 1–m read/write data from/to the memory chips 1–k according to the read/write requests. This is not limited in this embodiment of this application.

A person skilled in the art easily understands that a memory physical interface (for example, a PHY) is configured to transmit a signal between a processor and a memory chip. The memory physical interface includes a plurality of signal wires, and each signal wire may correspond to one signal. Both a signal sent by the processor to the memory chip and a signal sent by the memory chip to the processor are transmitted by using corresponding signal wires in the memory physical interface. In this specification, signals transmitted between the processor and the memory chip by using the memory physical interface are defined as memory interface signals. For example, the memory interface signals include a DQ signal, a DQS signal, a DM signal, a CTL signal, a CMD signal, and a CK signal. In this specification, the memory interface signals may include a target signal and a synchronization signal of the target signal. For example, the DQ signal may be a target signal, and the DQS signal is a synchronization signal of the DQ signal. For another example, the DM signal may be a target signal, and the DQS signal is a synchronization signal of the DM signal. For another example, the CTL signal may be a target signal, and the CK signal may be a synchronization signal of the CTL signal. In a process of starting the computer system 00, the processor 01 can perform memory training on the computer system 00 to adjust a timing relationship between a target signal of each memory physical interface and a synchronization signal of the target signal, so that timing alignment can be achieved between the target signal and the synchronization signal of the target signal. In this way, correctness and reliability of sampling performed on the target signal based on the synchronization signal are ensured. Optionally, one of the q cores of the processor 01 is a master core, and the master core performs memory training on the computer system 00 in the process of starting the computer system 00. In an example, assuming that the core 1 is the master core, the core 1 can perform memory training on the m memory channels sequentially to adjust timing relationships between target signals of PHYs in the m memory channels and synchronization signals of the target signals. For example, the core 1 may first adjust a timing relationship between a target signal of the PHY 1 and a synchronization signal of the target signal by performing memory training on the memory channel 1, then adjust a timing relationship between a target signal of the PHY 2 and a synchronization signal of the target signal by performing memory training on the memory channel 2, and finally adjust a timing relationship between a target signal of the PHY m and a synchronization signal of the target signal by performing memory training on the memory channel m. In another example, the core 1 performs memory training on the m memory channels simultaneously to adjust timing relationships between target signals of PHYs in the m memory channels and synchronization signals of the target signals. This is not limited in this embodiment of this application.

For example, a timing relationship between a DQ signal and a DQS signal is adjusted through memory training. The memory physical interface of the computer system includes a plurality of DQ wires and a plurality of DQS wires. The DQS signal is transmitted between the processor and the memory chip through a DQS wire (specifically, transmitted between the DMC in the processor and the memory chip). The DQ signal is transmitted between the processor and the memory chip through a DQ wire (specifically, transmitted between the DMC in the processor and the memory chip). One DQS wire needs to be used to sample a plurality of DQ wires simultaneously (that is, a DQS signal transmitted by one DQS wire needs to be simultaneously used as a synchronization signal for DQ signals transmitted by a plurality of DQ wires). For example, one DQS wire needs to be used to sample four DQ wires or eight DQ wires simultaneously. This is specifically determined based on a data bit width of the memory chip. Using a write direction (that is, the DMC of the processor writes data to the memory chip) as an example, when the DMC writes DQ data to the memory chip, the DMC is a transmit end of the DQ signal, and the memory chip is a receive end of the DQ signal. The DMC also sends the DQS signal to the memory chip while sending the DQ signal to the memory chip. A driving capability of a signal output by the DMC is affected by an external factor such as a power supply voltage or an ambient temperature. In addition, a plurality of DQ wires sampled by one DQS wire may not be completely equal in length, and the DQS wire and the DQ wires may not be completely equal in length either. Therefore, if memory training is not performed, when the DMC sends a DQS signal and a plurality of DQ signals to the memory chip, some of the plurality of DQ signals may arrive at the memory chip before a sampling edge of the DQS signal arrives, and some of the DQ signals may arrive at the memory chip after the sampling edge of the DQS signal arrives. Consequently, center positions of the plurality of DQ signals cannot be simultaneously aligned with the sampling edge of the DQS signal on the memory chip side, and the memory chip cannot correctly sample the plurality of DQ signals. Through memory training, delays of the plurality of DQ signals can be adjusted, so that the sampling edge of the DQS signal can be aligned with the center positions of the plurality of DQ signals simultaneously. In this way, the plurality of DQ signals can simultaneously arrive at the memory chip before the sampling edge of the DQS signal arrives, and the memory chip can correctly sample the plurality of DQ signals easily.

Figure 2:
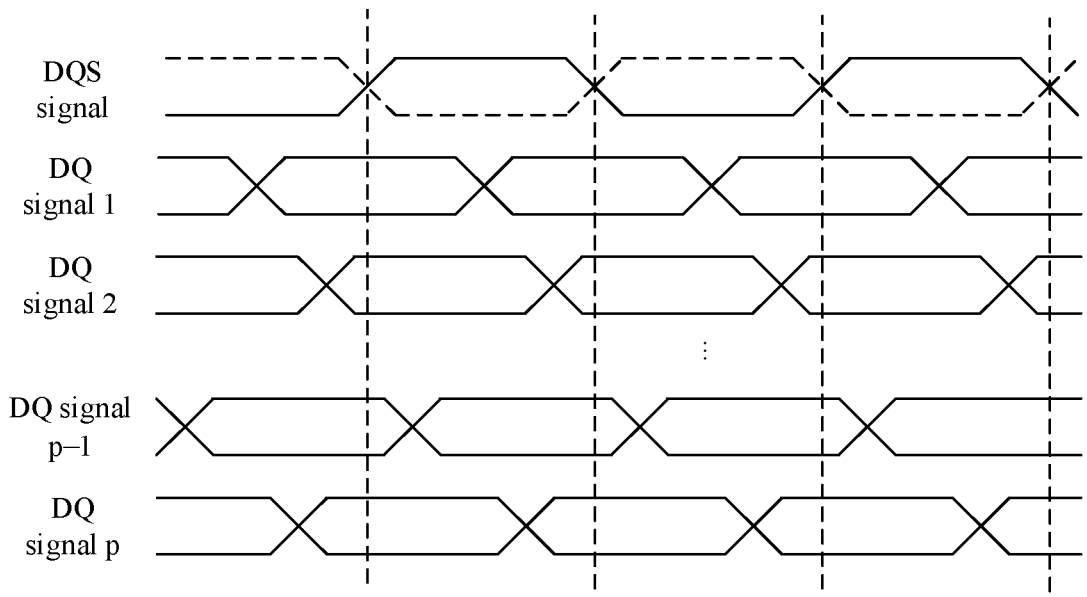
FIG. 2 is a sequence diagram of a DQS signal and a DQ signal according to an embodiment of this application.
Figure 3:
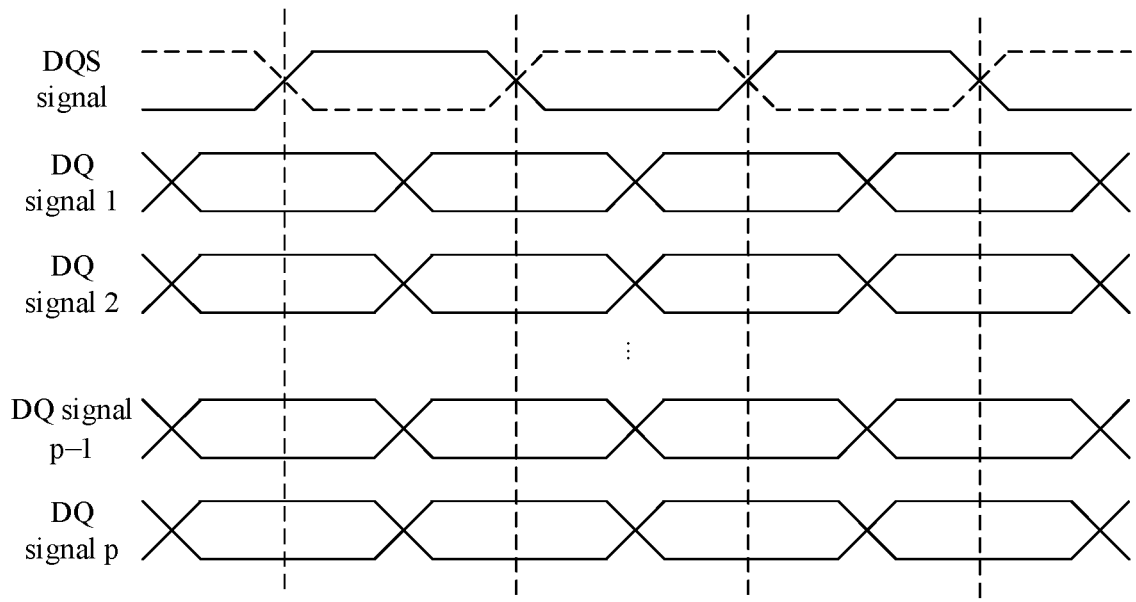
FIG. 3 is another sequence diagram of a DQS signal and a DQ signal according to an embodiment of this application.

For example, FIG. 2 and FIG. 3 are two sequence diagrams of signals provided in this embodiment of this application. Both FIG. 2 and FIG. 3 show one DQS signal and p DQ signals (including a DQ signal 1, a DQ signal 2, . . . , a DQ signal p). A cycle of the DQS signal is the same as cycles of the p DQ signals, where p≥1, and p is an integer, for example, p=4 or 8. FIG. 2 is a sequence diagram when one DQS signal and p DQ signals sent by the DMC to the memory chip arrive at the memory chip before memory training is performed. FIG. 3 is a sequence diagram when one DQS signal and p DQ signals sent by the DMC to the memory chip arrive at the memory chip after memory training is performed. The memory chip samples the p DQ signals at a sampling edge (including a rising edge and a falling edge) of the DQS signal. As shown in FIG. 2, among the p DQ signals, only a center position of the DQ signal 1 is aligned with the sampling edge of the DQS signal, and center positions of the other DQ signals are all staggered with the sampling edge of the DQS signal. Therefore, the memory chip may be unable to correctly sample the p DQ signals based on the DQS signal. As shown in FIG. 3, center positions of the p DQ signals are all aligned with the sampling edge of the DQS signal. Therefore, the memory chip can correctly sample the p DQ signals based on the DQS signal. In this embodiment of this application, the sampling edge of the DQS signal includes the rising edge and the falling edge. The rising edge is an edge where the DQS signal changes from a low level to a high level, and the falling edge is an edge where the DQS signal changes from a high level to a low level. Because a level change requires some time, as shown in FIG. 2 and FIG. 3, both the rising edge and the falling edge of the DQS signal have a slope, and the sampling edge of the DQS signal has a slope. Alignment between a center position of a DQ signal and the sampling edge of the DQS signal in this embodiment of this application means that a center position of the high level of the DQ signal is aligned with a center position of the sampling edge of the DQS signal. This is not limited in this embodiment of this application.

It should be noted that a center position of a sampling window of a target signal (for example, the DQ signal) may be obtained through memory training, where the center position corresponds to one delay value, and the delay value is a delay value of the target signal relative to a synchronization signal of the target signal, for example, a delay value of the center position of the DQ signal relative to the sampling edge of the DQS signal. The memory physical interface (such as a PHY) includes a shadow register corresponding to the target signal and a delay circuit (such as a delay-locked loop (DLL)). After memory training, a delay value corresponding to a center position of a sampling window of each target signal can be configured in a corresponding shadow register, so that the delay circuit in the memory physical interface can delay the target signal based on the delay value stored in the shadow register. Therefore, when the target signal arrives at a receive end (for example, the memory chip) from a transmit end (for example, the DMC), timing alignment can be achieved between the target signal and the synchronization signal of the target signal, so that the receive end can correctly sample the target signal. It may be understood that, in this embodiment of this application, the timing alignment between the target signal and the synchronization signal of the target signal refers to timing alignment between the target signal and the synchronization signal of the target signal when the target signal and the synchronization signal of the target signal arrive at the receive end. In the write direction (that is, the DMC writes data to the memory chip), the DMC is a transmit end, and the memory chip is a receive end; and in a read direction (that is, the DMC of the processor reads data from the memory chip), the memory chip is a transmit end, and the DMC is a receive end.

A person skilled in the art easily understands that adjusting the timing relationship between the DQS signal and the DQ signal is only a part of tasks of memory training. In addition to adjusting the timing relationship between the DQS signal and the DQ signal, a timing relationship between other signals also needs to be adjusted in a memory training process. For example, a timing relationship between the DQS signal and the DM signal is adjusted, so that the sampling edge of the DQS signal is aligned with a center position of the DM signal. For another example, a timing relationship between the CTL signal and the CK signal is adjusted, so that a sampling edge of the CK signal is aligned with a center position of the CTL signal. This is not limited in this embodiment of this application. In addition, in the memory training process, a value of a termination resistor in the memory channel, a reference voltage value, and the like may be adjusted, so that the value of the termination resistor in the memory channel and the reference voltage value match the memory channel. Moreover, a refresh rate, a clock frequency, and the like of the memory chip may be adjusted, so that the refresh rate and the clock frequency of the memory chip match specifications of the memory chip. Details are not listed in this embodiment of this application.

The foregoing description is content about adjusting a timing relationship between memory interface signals through memory training in the process of starting the computer system. In a running process of the computer system after the computer system is started, due to adverse impact of an external factor such as a power supply voltage or an ambient temperature, a delay of a memory interface signal may change. The timing relationship between the target signal and the synchronization signal of the target signal, obtained through training in the process of starting the computer system, changes consequently, and correctness of sampling performed on the signal is affected. For example, in the process of starting the computer system, timing of the DQS signal and the p DQ signals that are sent by the memory controller to the memory chip after memory training is shown in FIG. 3. However, in the running process of the computer system after the computer system is started, due to adverse impact of an external factor such as a power supply voltage or an ambient temperature, the timing relationship between the DQS signal and the p DQ signals changes. As a result, the center positions of the p DQ signals cannot be aligned with the sampling edge of the DQS signal.

A DQS interval oscillator is disposed in the memory chip of the computer system. Currently, to ensure that signals can be correctly sampled in the running process of the computer system after the computer system is started, a delay variation of a test signal may be detected by using the DQS interval oscillator in the memory chip. Delay compensation is performed on the memory interface signal based on the delay variation of the test signal to achieve timing alignment between the target signal of the memory physical interface and the synchronization signal of the target signal. For example, in the running process of the computer system after the computer system is started (that is, after memory training in a startup stage is performed), the test signal can be cycled for 1000 times within fixed duration by using the DQS interval oscillator (for example, the test signal is transmitted for 1000 cycles in the DQS interval oscillator). In the running process of the computer system after the computer system is started, when an external factor changes, the test signal can be cycled only for 900 times within the same fixed duration by using the DQS interval oscillator. This indicates that the delay of the test signal has changed, and the delay variation of the test signal can be calculated accordingly. Delay compensation is performed on the memory interface signal based on the delay variation of the test signal. For example, delay compensation is performed on the DQ signal based on the delay variation of the test signal, so that the center position of the DQ signal is aligned with the sampling edge of the DQS signal. However, due to adverse impact of the external factor, a delay variation of the memory interface signal may be different from the delay variation of the test signal. Therefore, accuracy of delay compensation performed on the memory interface signal based on the delay variation of the test signal is relatively low, and correctness and reliability of sampling performed on the target signal are affected.

In view of this, embodiments of this application provide a processor, a signal adjustment method, and a computer system. Because a first processor core is added to a memory controller of the processor, in a running process of the computer system including the processor after the computer system is started, the first processor core can adjust a timing relationship between a target signal of a memory physical interface and a synchronization signal of the target signal, so that when the target signal and the synchronization signal arrive at a receive end, timing alignment is achieved between the target signal and the synchronization signal. This helps ensure correctness and reliability of sampling performed on the target signal. It should be noted that the processor provided in this embodiment of this application may be, for example, but is not limited to a CPU, a graphics processing unit (GPU), an application-specific integrated circuit (ASIC), a system on chip (SoC), or an electronic control unit. For ease of description, in the following embodiments, an example in which the processor is applied to the computer system is used as an example. The computer system may be, for example, but is not limited to a smartphone, a tablet computer, a notebook computer, a desktop computer, a multimedia player, an electronic reader, a wearable device, a self-driving car, or a server. This is not limited in this embodiment of this application. The following describes solutions provided in embodiments of this application with reference to the accompanying drawings.

Figure 4:
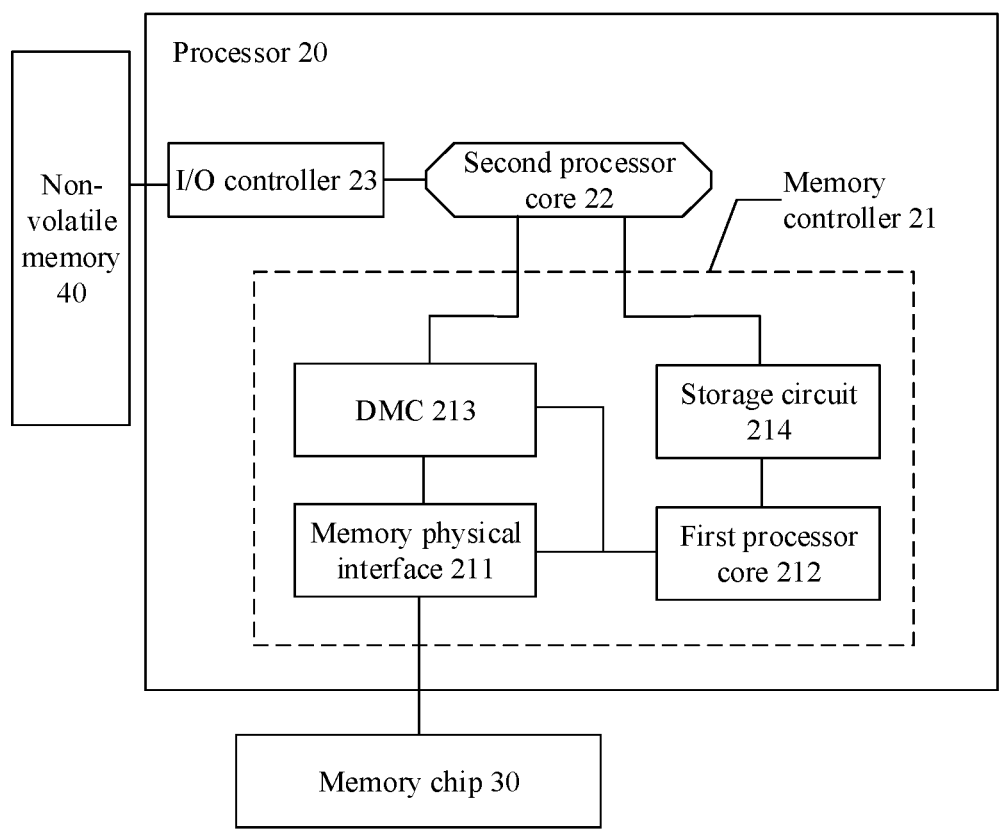
FIG. 4 is a schematic diagram of a structure of a computer system according to an embodiment of this application.

For example, FIG. 4 is a schematic diagram of a structure of a computer system 10 that includes a processor 20 according to an embodiment of this application. The computer system 10 further includes a memory chip 30 connected to the processor 20.

As shown in FIG. 4, the processor 20 includes a memory controller 21. The memory controller 21 includes a memory physical interface 211 and a first processor core 212, and the first processor core 212 is connected to the memory physical interface 211. In a running process of the computer system 10 including the processor 20 after the computer system 10 is started, the first processor core 212 is configured to adjust a timing relationship between a target signal of the memory physical interface 211 and a synchronization signal of the target signal, where both the target signal and the synchronization signal are signals transmitted by using the memory physical interface 211. Optionally, both the target signal and the synchronization signal are signals transmitted between the processor 20 and the memory chip 30 by using the memory physical interface 211. As shown in FIG. 4, the memory controller 21 further includes a DMC 213. The DMC 213 is separately connected to the memory physical interface 211 and the first processor core 212. The memory chip 30 is connected to the memory physical interface 211 (that is, the processor 20 is connected to the memory chip 30 by using the memory physical interface 211). The target signal and the synchronization signal may be signals transmitted between the DMC 213 and the memory chip 30 by using the memory physical interface 211.

In this embodiment of this application, the first processor core 212 adjusts the timing relationship between the target signal of the memory physical interface 211 and the synchronization signal of the target signal to achieve timing alignment between the target signal and the synchronization signal, that is, achieve timing alignment between the target signal and the synchronization signal when the target signal and the synchronization signal arrive at a receive end. For example, the target signal may be a DQ signal, the synchronization signal may be a DQS signal, and the first processor core 212 is configured to adjust a timing relationship between the DQ signal and the DQS signal in the running process of the computer system 10 including the processor 20 after the computer system 10 is started, to align a sampling edge of the DQS signal with a center position of the DQ signal.

In summary, in the processor provided in this embodiment of this application, in the running process of the computer system including the processor after the computer system is started, the first processor core in the memory controller of the processor can adjust the timing relationship between the target signal of the memory physical interface and the synchronization signal of the target signal. This helps ensure timing alignment between the target signal and the synchronization signal and therefore helps ensure correctness and reliability of sampling performed on the target signal.

Optionally, in the running process of the computer system 10 including the processor 20 after the computer system 10 is started, when a training condition is met, the first processor core 212 is specifically configured to adjust the timing relationship between the target signal of the memory physical interface 211 and the synchronization signal of the target signal through memory training. In this embodiment of this application, in the running process of the computer system 10 including the processor 20 after the computer system 10 is started, the processor 20 may detect whether the training condition is met. When the training condition is met, the first processor core 212 of the processor 20 adjusts the timing relationship between the target signal of the memory physical interface 211 and the synchronization signal of the target signal through memory training; or when the training condition is not met, the first processor core 212 of the processor 20 does not adjust the timing relationship between the target signal of the memory physical interface 211 and the synchronization signal of the target signal, and the processor 20 continues to detect whether the training condition is met. Optionally, the first processor core 212 may detect whether the training condition is met. Alternatively, as shown in FIG. 4, the processor 20 further includes a second processor core 22, and the second processor core 22 may also detect whether the training condition is met. This is not limited in this embodiment of this application. The second processor core 22 may be a master processor core of the processor 20, the first processor core 212 may be a slave processor core of the processor 20, and the first processor core 212 may be a logic circuit (or module) having a logic computing capability.

Optionally, the training condition includes at least one of the following: duration from previous memory training reaches first preset duration; a delay variation detected by a delay detection circuit on a memory chip (for example, the memory chip 30) connected to the processor 20 is greater than a preset variation; and duration in which the memory chip connected to the processor 20 (for example, the memory chip 30) is in an idle state reaches second preset duration. The first preset duration, the second preset duration, and the preset variation may all be configured in the processor 20 before the first processor core 212 performs memory training. Specific values of the first preset duration, the second preset duration, and the preset variation may be set based on an actual situation.

Optionally, a timer is disposed in the processor 20, and the timer may send a trigger signal to the first processor core 212 at an interval of the first preset duration. When the first processor core 212 receives the trigger signal sent by the timer, the first processor core 212 determines that the training condition is met. The timer may be disposed in the memory controller 21 (for example, the timer may be disposed in the memory physical interface 211 or the first processor core 212), or may be disposed in the second processor core 22. This is not limited in this embodiment of this application. For example, each time after performing memory training, the first processor core 212 may set the timer to count down by the first preset duration. When the timer countdown ends, the timer sends a trigger signal to the first processor core 212, to trigger the first processor core 212 to adjust the timing relationship between the target signal of the memory physical interface 211 and the synchronization signal of the target signal through memory training.

Optionally, a delay detection circuit is disposed in the memory chip (for example, the memory chip 30) connected to the processor 20, and the delay detection circuit may detect a delay variation of a test signal. The first processor core 212 may detect whether the delay variation of the test signal is greater than a preset variation. When the first processor core 212 determines that the delay variation of the test signal is greater than the preset variation, the first processor core 212 determines that the training condition is met. For example, the delay detection circuit may be a DQS interval oscillator.

Optionally, the first processor core 212 may perform status monitoring on the memory chip (for example, the memory chip 30) connected to the processor 20. The first processor core 212 determines, by performing status monitoring on the memory chip (for example, the memory chip 30) connected to the processor 20, duration in which the memory chip (for example, the memory chip 30) is in an idle state. Then the first processor core 212 detects whether the duration in which the memory chip (for example, the memory chip 30) is in the idle state is greater than the second preset duration. When the first processor core 212 determines that the duration in which the memory chip (for example, the memory chip 30) is in the idle state is greater than the second preset duration, the first processor core 212 determines that the training condition is met. For example, that the memory chip is in the idle state means that the memory chip is in a state without data writing or reading.

It should be noted that the processor 20 may be connected to at least one memory chip. Specifically, the memory physical interface of the processor 20 is connected to the memory chip, a delay detection circuit may be disposed on each memory chip, and the delay detection circuit on each memory chip may detect a delay variation of a test signal. In addition, the processor 20 may perform status monitoring on each memory chip. In this embodiment of this application, the first processor core connected to the memory physical interface 211 detects whether the delay variation detected by the delay detection circuit on the memory chip connected to the memory physical interface 211 is greater than the preset variation; and the first processor core connected to the memory physical interface 211 performs status monitoring on the memory chip connected to the memory physical interface 211. When a delay variation detected by a delay detection circuit on any memory chip connected to the processor 20 is greater than the preset variation, or when duration in which any memory chip connected to the processor 20 is in the idle state reaches the second preset duration, the first processor core 212 determines that the training condition is met. The memory chip 30 may be any memory chip connected to the processor 20.

Optionally, in the running process of the computer system 10 including the processor 20 after the computer system 10 is started, the first processor core 212 is specifically configured to adjust the timing relationship between the target signal and the synchronization signal of the target signal through memory training based on an initial training result, where the initial training result is a training result obtained by performing memory training on the computer system 10 before current memory training is performed. For example, the initial training result may be a training result obtained by performing memory training on the computer system 10 in the process of starting the computer system 10, or in other words, the initial training result is a training result obtained by performing training in a process of initializing the computer system 10. Alternatively, the initial training result may be a training result obtained by performing memory training on the computer system 10 previously before the current memory training is performed in the running process of the computer system 10 after the computer system 10 is started. In addition, in the process of starting the computer system 10, the first processor core 212 may perform memory training on the computer system 10, or the second processor core 22 may perform memory training on the computer system 10. This is not limited in this embodiment of this application. In this embodiment of this application, the first processor core 212 adjusts the timing relationship between the target signal and the synchronization signal of the target signal through memory training based on the initial training result. This helps reduce an amount of computation in the memory training process and reduce time consumption of the first processor core 212 in adjusting the timing relationship between the target signal and the synchronization signal of the target signal. Optionally, in the running process of the computer system after the computer system is started, the computer system undergoes at least memory training in the initialization process. Therefore, performing memory training on the computer system in the running process of the computer system after the computer system is started may be considered as performing retraining on the computer system. In some scenarios, memory training performed on the computer system in the running process of the computer system after the computer system is started is also referred to as retraining.

Optionally, the initial training result includes an initial left boundary and an initial right boundary of a sampling window of the target signal; and the first processor core 212 is specifically configured to adjust the timing relationship between the target signal and the synchronization signal through memory training based on the initial training result by performing the following training step, where the training step includes: determining a target left boundary of the sampling window of the target signal based on the initial left boundary; determining a target right boundary of the sampling window of the target signal based on the initial right boundary; and determining a target center position of the sampling window of the target signal based on the target left boundary and the target right boundary. For example, the target center position is aligned with a sampling edge of the synchronization signal, and a delay of the target center position relative to the sampling edge of the synchronization signal is 0, that is, a moment at which the target center position is located is the same as a moment at which the sampling edge of the synchronization signal is located. Optionally, a center position between the target left boundary and the target right boundary may be determined as the target center position. In this embodiment of this application, the sampling window of the target signal has a left boundary and a right boundary. The initial left boundary is a left boundary of the sampling window included in the initial training result, and the initial right boundary is a right boundary of the sampling window included in the initial training result. The target left boundary is a left boundary of the sampling window determined through memory training based on the initial left boundary, and the target right boundary is a right boundary of the sampling window determined through memory training based on the initial right boundary. Each position in the initial left boundary, the initial right boundary, the target left boundary, the target right boundary, and the target center position corresponds to one delay value, and the delay value is a delay value of the target signal relative to the synchronization signal of the target signal. The delay value corresponding to the target center position is obtained by dividing a sum of the delay value corresponding to the target left boundary and the delay value corresponding to the target right boundary by 2. For example, the delay value corresponding to each position in the initial left boundary, the initial right boundary, the target left boundary, the target right boundary, and the target center position may be a difference between a moment at which the position is located and the moment at which the sampling edge of the synchronization signal of the target signal is located. For example, the delay value corresponding to the initial left boundary is a difference between a moment at which the initial left boundary is located and the moment at which the sampling edge of the synchronization signal of the target signal is located.

Figure 5:
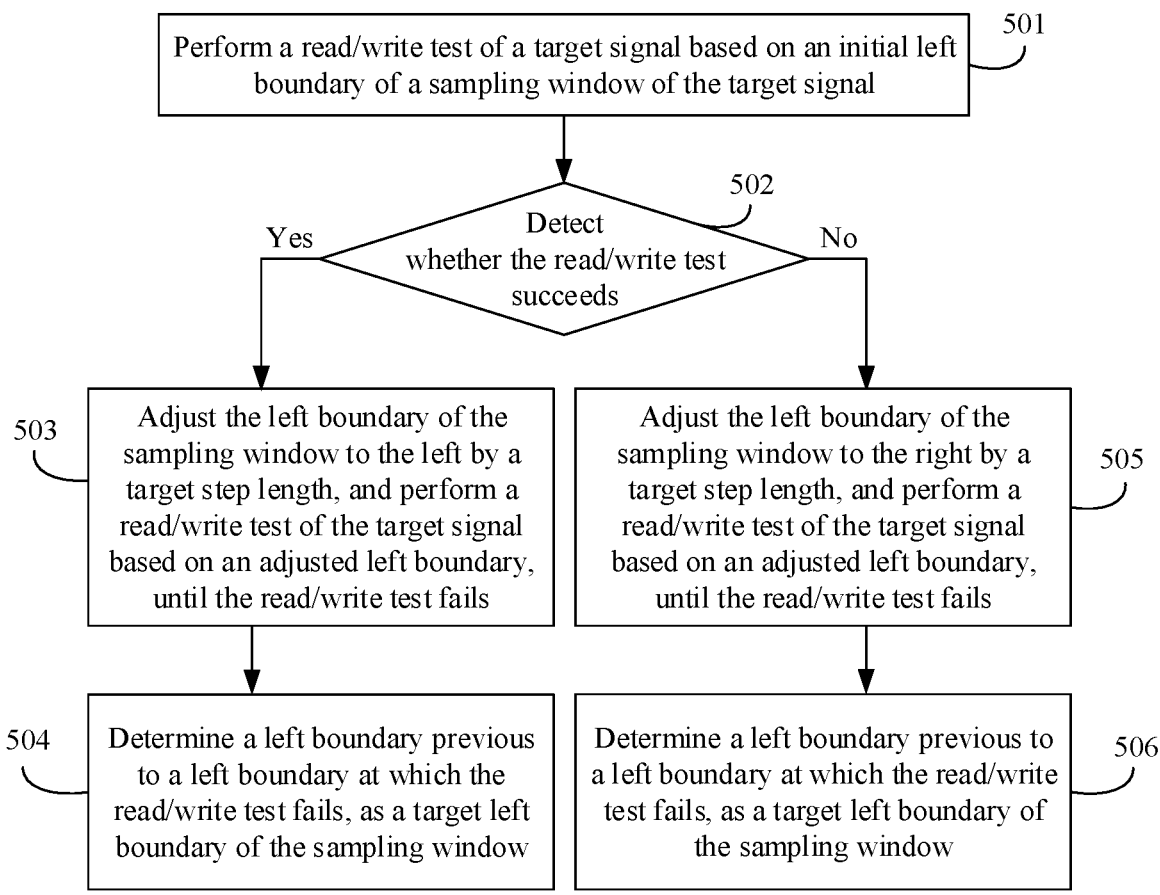
FIG. 5 is a flowchart for determining a target left boundary based on an initial left boundary according to an embodiment of this application.

Optionally, FIG. 5 is a flowchart for determining a target left boundary of a sampling window of a target signal based on an initial left boundary according to an embodiment of this application. Referring to FIG. 5, the determining a target left boundary of a sampling window of a target signal based on an initial left boundary may include the following steps.

Step 501: Perform a read/write test of the target signal based on the initial left boundary of the sampling window of the target signal.

Optionally, the initial left boundary may correspond to one delay value. The first processor core 212 first controls the DMC 213 to write, based on the delay value, target data to the memory chip (for example, the memory chip 30) connected to the memory physical interface 211, and then controls the DMC 213 to read the target data from the memory chip 30 based on the delay value, to perform the read/write test of the target signal based on the initial left boundary.

Optionally, that the first processor core 212 controls the DMC 213 to write target data to the memory chip 30 based on the delay value may include: the first processor core 212 sends a write instruction to the DMC 213 based on the delay value, and the DMC 213 sends a target signal (for example, a DQ signal) and a synchronization signal (for example, a DQS signal) of the target signal to the memory chip 30 according to the write instruction by using the memory physical interface 211. In a process in which the target signal passes through the memory physical interface 211, a delay circuit in the memory physical interface 211 delays the target signal based on the delay value, so that a delay of the target signal relative to the synchronization signal of the target signal is equal to the delay value; and when the target signal and the synchronization signal arrive at the memory chip 30, the memory chip 30 performs sampling on the target signal based on the synchronization signal to obtain the target data.

Optionally, that the first processor core 212 controls the DMC 213 to read the target data from the memory chip 30 based on the delay value may include: the first processor core 212 sends a read instruction to the DMC 213 based on the delay value, and the DMC 213 reads the target data from the memory chip 30 according to the read instruction. For example, the DMC 213 triggers, according to the read instruction, the memory chip 30 to send a target signal (for example, a DQ signal) and a synchronization signal (for example, a DQS signal) of the target signal to the DMC 213. In a process in which the target signal passes through the memory physical interface 211, the delay circuit in the memory physical interface 211 delays the target signal based on the delay value, so that a delay of the target signal relative to the synchronization signal of the target signal is equal to the delay value; and when the target signal and the synchronization signal arrive at the DMC 213, the DMC 213 performs sampling on the target signal based on the synchronization signal to obtain the target data.

Step 502: Detect whether the read/write test succeeds; and if the read/write test succeeds, perform step 503 and step 504; or if the read/write test fails, perform step 505 and step 506.

The first processor core 212 may detect whether the target data written by the DMC 213 to the memory chip 30 is the same as the target data read by the DMC 213 from the memory chip 30. If the target data written by the DMC 213 to the memory chip 30 is the same as the target data read by the DMC 213 from the memory chip 30, the first processor core 212 determines that the read/write test succeeds. If the target data written by the DMC 213 to the memory chip 30 is different from the target data read by the DMC 213 from the memory chip 30, the first processor core 212 determines that the read/write test fails.

Step 503: Adjust the left boundary of the sampling window to the left by a target step length, and perform a read/write test of the target signal based on an adjusted left boundary, until the read/write test fails.

If the first processor core 212 determines that the read/write test succeeds in step 502, the first processor core 212 determines that correct sampling can be performed on the target signal when the delay value of the target signal relative to the synchronization signal of the target signal is equal to the delay value corresponding to the initial left boundary. Therefore, the delay value corresponding to the initial left boundary is available, and the first processor core 212 adjusts the left boundary of the sampling window to the left, and performs the read/write test of the target signal based on the adjusted left boundary. Optionally, the first processor core 212 adjusts the left boundary of the sampling window to the left by the target step length, and performs the read/write test of the target signal based on the adjusted left boundary, until the read/write test fails. A person skilled in the art easily understands that, in the process in which the first processor core 212 adjusts the left boundary of the sampling window to the left by the target step length, and performs the read/write test of the target signal based on the adjusted left boundary, if the read/write test performed by the first processor core 212 on the left boundary fails, it indicates that the delay value corresponding to the left boundary is unavailable, and that a delay value corresponding to a position on the left of the left boundary is also unavailable. Therefore, the first processor core 212 stops adjusting the left boundary of the sampling window and performing the read/write test.

Optionally, each time the first processor core 212 adjusts the left boundary of the sampling window, the adjusted left boundary corresponds to one delay value. The first processor core 212 first controls the DMC 213 to write the target data to the memory chip 30 based on the delay value, and then controls the DMC 213 to read the target data from the memory chip 30 based on the delay value, to perform the read/write test of the target signal based on the adjusted left boundary. For a specific implementation process in which the first processor core 212 performs the read/write test of the target signal based on the adjusted left boundary, refer to step 501. Details are not described herein again in this embodiment of this application.

Optionally, the target step length may be determined based on a cycle length of the synchronization signal of the target signal, or determined based on a cycle length of a clock signal of the processor 20. For example, if the cycle length T of the synchronization signal is divided into i equal parts, the target step length may be equal to a length T/i of any equal part, where i>1, and i is an integer. For example, if the target signal is a DQ signal, and the synchronization signal of the target signal is a DQS signal, and a cycle length T of the DQS signal may be divided into 512 equal parts, the target step length may be equal to T/512. A person skilled in the art easily understands that the description of the target step length in this embodiment of this application is merely an example. In an actual application, the target step length may be flexibly adjusted, and target step lengths used for adjusting the boundary of the sampling window for a plurality of times may be equal or unequal. For example, the target step length used for adjusting the left boundary for the second time is equal to the target step length used for adjusting the left boundary for the first time, and the target step length used for adjusting the left boundary for the third time is twice the target step length used for adjusting the left boundary for the second time. This is not limited in this embodiment of this application.

Step 504: Determine a left boundary previous to a left boundary at which the read/write test fails, as the target left boundary of the sampling window.

The left boundary previous to the left boundary at which the read/write test fails is a left boundary corresponding to a successful read/write test that is before the failed read/write test and that is closest to the failed read/write test, and the previous left boundary is a left boundary at which the read/write test succeeds.

A person skilled in the art easily understands that, in the process in which the first processor core 212 adjusts the left boundary of the sampling window to the left by the target step length, and performs the read/write test of the target signal based on the adjusted left boundary, if the read/write test performed by the first processor core 212 on the left boundary fails, it indicates that the delay value corresponding to the left boundary is unavailable, and that the delay value corresponding to the position on the left of the left boundary is also unavailable, and that a delay value corresponding to a left boundary at which a previous test succeeds on the right of the left boundary is available. Therefore, the first processor core 212 determines the left boundary previous to the left boundary at which the read/write test fails, as the target left boundary of the sampling window.

Step 505: Adjust the left boundary of the sampling window to the right by a target step length, and perform a read/write test of the target signal based on an adjusted left boundary, until the read/write test fails.

If the first processor core 212 determines that the read/write test fails in step 502, the first processor core 212 determines that correct sampling cannot be performed on the target signal when the delay value of the target signal relative to the synchronization signal of the target signal is equal to the delay value corresponding to the initial left boundary. Therefore, the delay value corresponding to the initial left boundary is unavailable, and the first processor core 212 adjusts the left boundary of the sampling window to the right, and performs the read/write test of the target signal based on the adjusted left boundary. Optionally, the first processor core 212 adjusts the left boundary of the sampling window to the right by the target step length, and performs the read/write test of the target signal based on the adjusted left boundary, until the read/write test fails. A person skilled in the art easily understands that, in the process in which the first processor core 212 adjusts the left boundary of the sampling window to the right by the target step length, and performs the read/write test of the target signal based on the adjusted left boundary, if the read/write test performed by the first processor core 212 on the left boundary fails, it indicates that the delay value corresponding to the left boundary is unavailable, and that a delay value corresponding to a position on the right of the left boundary is also unavailable. Therefore, the first processor core 212 stops adjusting the left boundary of the sampling window and performing the read/write test.

Optionally, each time the first processor core 212 adjusts the left boundary of the sampling window, the adjusted left boundary corresponds to one delay value. The first processor core 212 first controls the DMC 213 to write the target data to the memory chip 30 based on the delay value, and then controls the DMC 213 to read the target data from the memory chip 30 based on the delay value, to perform the read/write test of the target signal based on the adjusted left boundary. For a specific implementation process in which the first processor core 212 performs the read/write test of the target signal based on the adjusted left boundary, refer to step 501. Details are not described herein again in this embodiment of this application.

Step 506: Determine a left boundary previous to a left boundary at which the read/write test fails, as the target left boundary of the sampling window.

The left boundary previous to the left boundary at which the read/write test fails is a left boundary corresponding to a successful read/write test that is before the failed read/write test and that is closest to the failed read/write test, and the previous left boundary is a left boundary at which the read/write test succeeds.

A person skilled in the art easily understands that, in the process in which the first processor core 212 adjusts the left boundary of the sampling window to the right by the target step length, and performs the read/write test of the target signal based on the adjusted left boundary, if the read/write test performed by the first processor core 212 on the left boundary fails, it indicates that the delay value corresponding to the left boundary is unavailable, and that the delay value corresponding to the position on the right of the left boundary is also unavailable, and that a delay value corresponding to a left boundary at which a previous test succeeds on the left of the left boundary is available. Therefore, the first processor core 212 determines the left boundary previous to the left boundary at which the read/write test fails, as the target left boundary of the sampling window.

Figure 6:
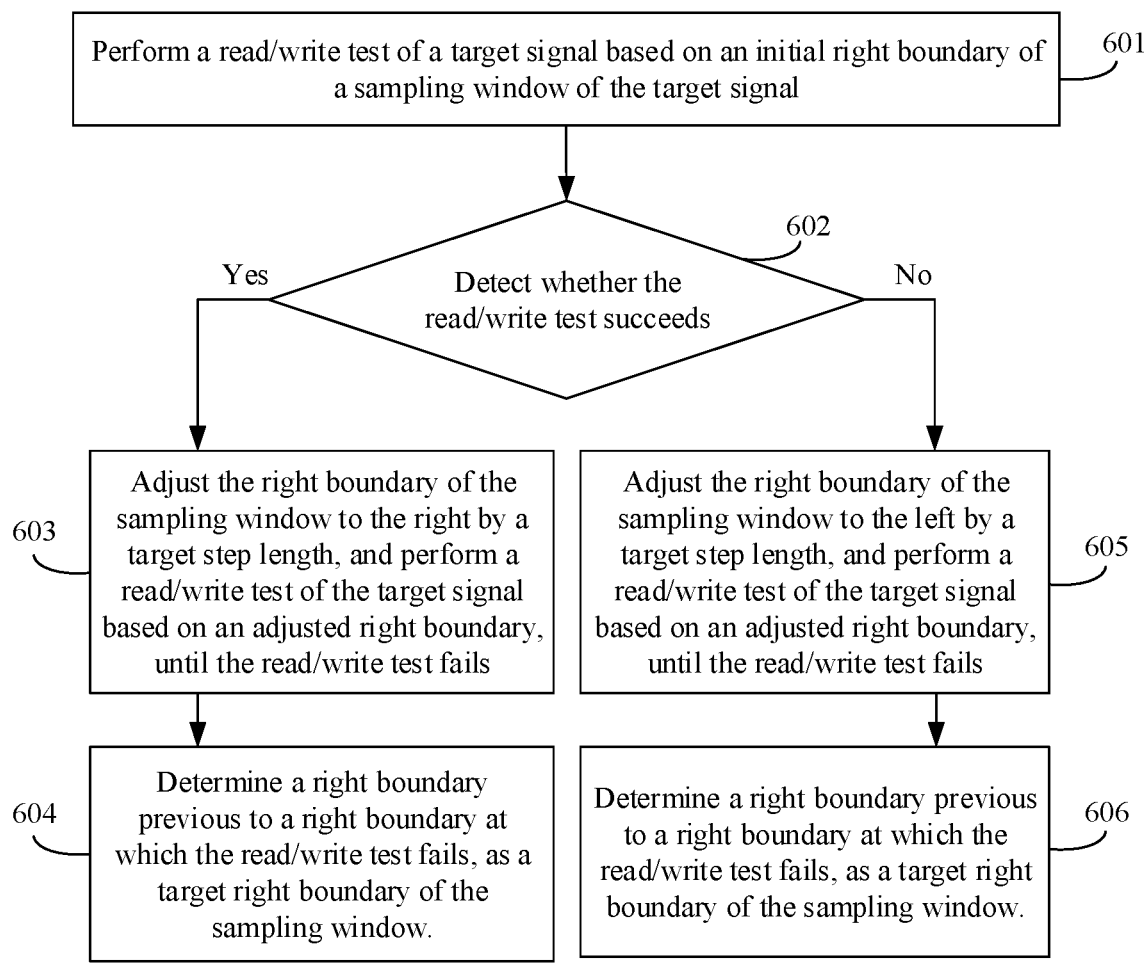
FIG. 6 is a flowchart for determining a target right boundary based on an initial right boundary according to an embodiment of this application.

Optionally, FIG. 6 is a flowchart for determining a target right boundary of a sampling window of a target signal based on an initial right boundary according to an embodiment of this application. Referring to FIG. 6, the determining a target right boundary of a sampling window of a target signal based on an initial right boundary may include the following steps.

Step 601: Perform a read/write test of the target signal based on the initial right boundary of the sampling window of the target signal.

Optionally, the initial right boundary may correspond to one delay value. For the process in which the first processor core 212 performs the read/write test of the target signal based on the initial right boundary of the sampling window of the target signal, refer to the foregoing step 501. Details are not described herein again.

Step 602: Detect whether the read/write test succeeds; and if the read/write test succeeds, perform step 603 and step 604; or if the read/write test fails, perform step 605 and step 606.

Step 603: Adjust the right boundary of the sampling window to the right by a target step length, and perform a read/write test of the target signal based on an adjusted right boundary, until the read/write test fails.

If the first processor core 212 determines that the read/write test succeeds in step 602, the first processor core 212 determines that correct sampling can be performed on the target signal when the delay of the target signal relative to the synchronization signal of the target signal is equal to the delay value corresponding to the initial right boundary. Therefore, the delay value corresponding to the initial right boundary is available, and the first processor core 212 adjusts the right boundary of the sampling window to the right, and performs the read/write test of the target signal based on the adjusted right boundary. Optionally, the first processor core 212 adjusts the right boundary of the sampling window to the right by the target step length, and performs the read/write test of the target signal based on the adjusted right boundary, until the read/write test fails. A person skilled in the art easily understands that, in the process in which the first processor core 212 adjusts the right boundary of the sampling window to the right by the target step length, and performs the read/write test of the target signal based on the adjusted right boundary, if the read/write test performed by the first processor core 212 on the right boundary fails, it indicates that the delay value corresponding to the right boundary is unavailable, and that a delay value corresponding to a position on the right of the right boundary is also unavailable. Therefore, the first processor core 212 stops adjusting the right boundary of the sampling window and performing the read/write test.

Step 604: Determine a right boundary previous to a right boundary at which the read/write test fails, as the target right boundary of the sampling window.

The right boundary previous to the right boundary at which the read/write test fails is a right boundary corresponding to a successful read/write test that is before the failed read/write test and that is closest to the failed read/write test, and the previous right boundary is a right boundary at which the read/write test succeeds.

A person skilled in the art easily understands that, in the process in which the first processor core 212 adjusts the right boundary of the sampling window to the right by the target step length, and performs the read/write test of the target signal based on the adjusted right boundary, if the read/write test performed by the first processor core 212 on the right boundary fails, it indicates that the delay value corresponding to the right boundary is unavailable, and that the delay value corresponding to the position on the right of the right boundary is also unavailable, and that a delay value corresponding to a right boundary at which a previous test succeeds on the left of the right boundary is available. Therefore, the first processor core 212 determines the right boundary previous to the right boundary at which the read/write test fails, as the target right boundary of the sampling window.

Step 605: Adjust the right boundary of the sampling window to the left by a target step length, and perform a read/write test of the target signal based on an adjusted right boundary, until the read/write test fails.

If the first processor core 212 determines that the read/write test fails in step 602, the first processor core 212 determines that correct sampling cannot be performed on the target signal when the delay of the target signal relative to the synchronization signal of the target signal is equal to the delay value corresponding to the initial right boundary. Therefore, the delay value corresponding to the initial right boundary is unavailable, and the first processor core 212 adjusts the right boundary of the sampling window to the left, and performs the read/write test of the target signal based on the adjusted right boundary. Optionally, the first processor core 212 adjusts the right boundary of the sampling window to the left by the target step length, and performs the read/write test of the target signal based on the adjusted right boundary, until the read/write test fails. A person skilled in the art easily understands that, in the process in which the first processor core 212 adjusts the right boundary of the sampling window to the left by the target step length, and performs the read/write test of the target signal based on the adjusted right boundary, if the read/write test performed by the first processor core 212 on the right boundary fails, it indicates that the delay value corresponding to the right boundary is unavailable, and that a delay value corresponding to a position on the left of the right boundary is also unavailable. Therefore, the first processor core 212 stops adjusting the right boundary of the sampling window and performing the read/write test.

Step 606: Determine a right boundary previous to a right boundary at which the read/write test fails, as the target right boundary of the sampling window.

The right boundary previous to the right boundary at which the read/write test fails is a right boundary corresponding to a successful read/write test that is before the failed read/write test and that is closest to the failed read/write test, and the previous right boundary is a right boundary at which the read/write test succeeds.

A person skilled in the art easily understands that, in the process in which the first processor core 212 adjusts the right boundary of the sampling window to the left by the target step length, and performs the read/write test of the target signal based on the adjusted right boundary, if the read/write test performed by the first processor core 212 on the right boundary fails, it indicates that the delay value corresponding to the right boundary is unavailable, and that the delay value corresponding to the position on the left of the right boundary is also unavailable, and that a delay value corresponding to a right boundary at which a previous test succeeds on the right of the right boundary is available. Therefore, the first processor core 212 determines the right boundary previous to the right boundary at which the read/write test fails, as the target right boundary of the sampling window.

Figure 7:
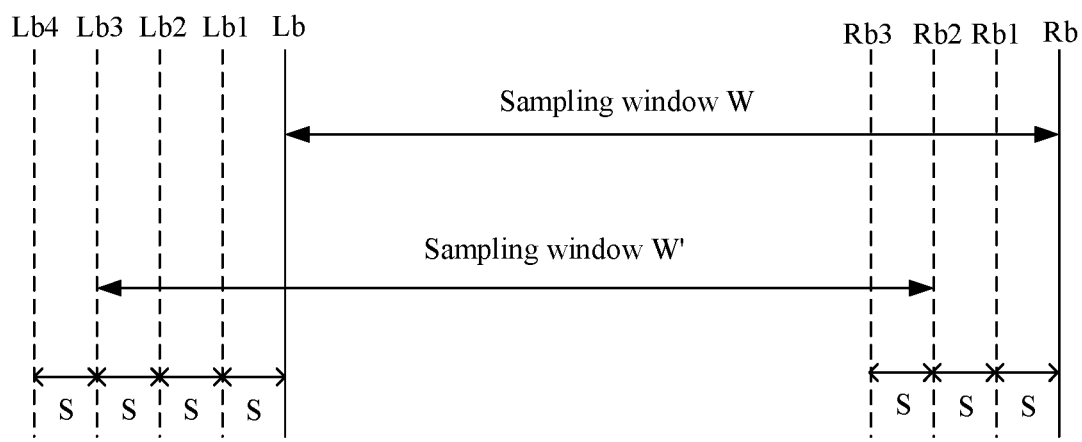
FIG. 7 is a schematic diagram for determining a target left boundary and a target right boundary according to an embodiment of this application.

With reference to FIG. 7, the following uses an example to describe the process in which the first processor core 212 determines the target left boundary of the sampling window based on the initial left boundary of the sampling window of the target signal, and determines the target right boundary of the sampling window based on the initial right boundary of the sampling window of the target signal. Referring to FIG. 7, the initial left boundary of the sampling window W of the target signal is Lb, and the initial right boundary is Rb. An example in which the first processor core 212 first determines the target left boundary and then determines the target right boundary is used for description.

The process in which the first processor core 212 determines the target left boundary includes: the first processor core 212 first performs the read/write test of the target signal based on the initial left boundary Lb by using the method provided in step 501, and then detects, by using the method provided in step 502, whether the read/write test performed based on the initial left boundary Lb succeeds; and if the read/write test performed based on the initial left boundary Lb succeeds, the first processor core 212 determines the target left boundary of the sampling window based on the method provided in step 503 and step 504; or if the read/write test performed based on the initial left boundary Lb fails, the first processor core 212 determines the target left boundary of the sampling window based on the method provided in step 505 and step 506. In this specification, an example in which the read/write test performed by the first processor core 212 based on the initial left boundary Lb succeeds is used for description. The first processor core 212 adjusts the left boundary of the sampling window to the left by the target step length S, where an adjusted left boundary is Lb1, and the first processor core 212 performs a read/write test of the target signal based on the left boundary Lb1. Assuming that the read/write test performed based on the left boundary Lb1 succeeds, the first processor core 212 continues to adjust the left boundary of the sampling window to the left by the target step length S, where an adjusted left boundary is Lb2, and the first processor core 212 performs a read/write test of the target signal based on the left boundary Lb2. Assuming that the read/write test performed based on the left boundary Lb2 succeeds, the first processor core 212 continues to adjust the left boundary of the sampling window to the left by the target step length S, where an adjusted left boundary is Lb3, and the first processor core 212 performs a read/write test of the target signal based on the left boundary Lb3. Assuming that the read/write test performed based on the left boundary Lb3 succeeds, the first processor core 212 continues to adjust the left boundary of the sampling window to the left by the target step length S, where an adjusted left boundary is Lb4, and the first processor core 212 performs a read/write test of the target signal based on the left boundary Lb4. Assuming that the read/write test performed based on the left boundary Lb4 fails, the first processor core 212 determines the left boundary Lb3 (that is, a left boundary previous to the left boundary Lb4 at which the read/write test fails) as the target left boundary.

The process in which the first processor core 212 determines the target right boundary includes: the first processor core 212 first performs the read/write test of the target signal based on the initial right boundary Rb by using the method provided in step 601, and then detects, by using the method provided in step 602, whether the read/write test performed based on the initial right boundary Rb succeeds; and if the read/write test performed based on the initial right boundary Rb succeeds, the first processor core 212 determines the target right boundary of the sampling window based on the method provided in step 603 and step 604; or if the read/write test performed based on the initial right boundary Rb fails, the first processor core 212 determines the target right boundary of the sampling window based on the method provided in step 605 and step 606. In this specification, an example in which the read/write test performed by the first processor core 212 based on the initial right boundary Rb fails is used for description. The first processor core 212 adjusts the right boundary of the sampling window to the left by the target step length S, where an adjusted right boundary is Rb1, and the first processor core 212 performs a read/write test of the target signal based on the right boundary Rb1. Assuming that the read/write test performed based on the right boundary Rb1 succeeds, the first processor core 212 continues to adjust the right boundary of the sampling window to the left by the target step length S, where an adjusted right boundary is Rb2, and the first processor core 212 performs a read/write test of the target signal based on the right boundary Rb2. Assuming that the read/write test performed based on the right boundary Rb2 succeeds, the first processor core 212 continues to adjust the right boundary of the sampling window to the left by the target step length S, where an adjusted right boundary is Rb3, and the first processor core 212 performs a read/write test of the target signal based on the right boundary Rb3. Assuming that the read/write test performed based on the right boundary Rb3 fails, the first processor core 212 determines the right boundary Rb2 (that is, a right boundary previous to the right boundary Rb3 at which the read/write test fails) as the target right boundary.

In summary, with reference to FIG. 7, it may be determined that the target left boundary determined by the first processor core 212 through memory training is Lb3, and that the target right boundary is Rb2. After the memory training by the first processor core 212, the sampling window of the target signal changes from the sampling window W to a sampling window W'. In the sampling window W', a target left boundary is Lb3, and a target right boundary is Rb2.

With reference to the foregoing description, it is easily understood that, in this embodiment of this application, any position in the sampling window of the target signal and a position at which a boundary of the sampling window is located respectively correspond to one delay value, where each delay value is a delay value of the target signal relative to the synchronization signal of the target signal. The sampling window is equivalent to a delay range. When the delay value of the target signal relative to the synchronization signal of the target signal falls within the delay range, correct sampling of the target signal can be implemented. When the delay value of the target signal relative to the synchronization signal of the target signal falls beyond the delay range, correct sampling of the target signal cannot be implemented. Therefore, one delay range can be obtained through memory training in this embodiment of this application. The delay range is used to represent a delay relationship between the target signal and the synchronization signal of the target signal when correct sampling can be performed on the target signal. For example, delay ranges of 72 DQ signals (72 bits) in a read/write direction relative to DQS signals thereof may be obtained through memory training, where the 72 DQ signals may include 64 DQ data signals (64 bits) and 8 error checking and correction (ECC) signals (8 bits). Each DQ signal may be transmitted by using one DQ wire, and the 72 DQ signals are transmitted by using 72 DQ wires. A delay range of a DQ signal transmitted by using each DQ wire, relative to a DQS signal of the DQ signal, may be obtained by the first processor core 212 by performing the foregoing training step. The first processor core 212 may perform the foregoing training step to sequentially determine the delay ranges of the DQ signals transmitted by using the 72 DQ wires, relative to the DQS signals of the DQ signals, or may perform the foregoing training step to simultaneously determine delay ranges of DQ signals transmitted by using a plurality of (for example, eight) DQ wires, relative to DQS signals of the DQ signals. This is not limited in this embodiment of this application.

Figure 8:
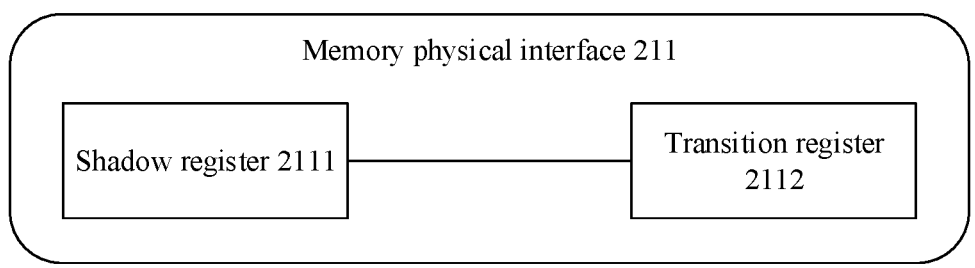
FIG. 8 is a schematic diagram of a structure of a memory physical interface according to an embodiment of this application.

Optionally, FIG. 8 is a schematic diagram of a structure of the memory physical interface 211 according to an embodiment of this application. The memory physical interface 211 may be a PHY. Referring to FIG. 8, the memory physical interface 211 includes a shadow register 2111 corresponding to the target signal and a transition register 2112 corresponding to the target signal, and either of the left boundary and the right boundary of the sampling window corresponds to one delay value, as described above. The left boundary may include a left boundary before adjustment and a left boundary after adjustment, and the right boundary may also include a right boundary before adjustment and a right boundary after adjustment. The first processor core 212 is further configured to: before performing each read/write test of the target signal, configure, in the transition register 2112 corresponding to the target signal, a delay value corresponding to a boundary of the sampling window based on which the current read/write test is performed; and when performing each read/write test of the target signal, load the delay value in the transition register 2112 corresponding to the target signal into the shadow register 2111 corresponding to the target signal. Correspondingly, the first processor core 212 is specifically configured to perform the read/write test of the target signal based on the delay value that is in the shadow register 2111 corresponding to the target signal and that corresponds to the boundary of the sampling window when the current read/write test of the target signal is performed. For example, when performing each read/write test of the target signal, the delay circuit in the memory physical interface 211 delays the target signal based on a current delay value in the shadow register 2111.

Optionally, when performing each read/write test of the target signal, the first processor core 212 may load the delay value in the transition register 2112 into the shadow register 2111 in a manner of hardware triggering. In this way, the process of loading the delay value into the shadow register 2111 can be accelerated. A person skilled in the art easily understands that the second processor core 22 needs to read/write data from/to the memory chip based on the delay value in the shadow register 2111, and that the first processor core 212 needs to perform the read/write test based on the delay value in the shadow register 2111. Therefore, inevitably, there is mutual impact between the read/write test process and the data read/write process of the second processor core 22. Therefore, when the first processor core 212 performs the read/write test, the second processor core 22 needs to suspend the data read/write process. However, if the delay value based on which the read/write test is performed is configured in the shadow register 2111 when the read/write test is performed, because the process of configuring the delay value in the shadow register 2111 takes a relatively long time, the read/write test process takes a relatively long time. As a result, the second processor core 22 suspends data read/write for a relatively long time, and performance of the processor 10 is affected. In view of this, in this embodiment of this application, the transition register 2112 is added to the memory physical interface 211, and the delay value based on which the read/write test is performed is configured in the transition register 2112 before the read/write test is performed. When the read/write test is performed, the delay value in the transition register 2112 is loaded into the shadow register 2111. In this way, adverse impact of the memory training process performed by the first processor core 212 on performance of the processor 10 is reduced.

A person skilled in the art easily understands that the memory physical interface 211 shown in FIG. 8 is merely an example. In an actual application, the memory physical interface 211 includes a plurality of signal wires, a plurality of shadow registers that are in a one-to-one correspondence with the plurality of signal wires, and a plurality of transition registers that are in a one-to-one correspondence with the plurality of signal wires. Each signal wire is used to transmit one signal, and in the memory training process, corresponding delay values need to be configured in the plurality of shadow registers for each read/write test. If the corresponding delay values are directly configured in the plurality of shadow registers, the process of configuring the delay values takes a relatively long time. In this embodiment of this application, before the read/write test is performed, the delay values based on which the read/write test is performed may be configured in the plurality of transition registers in a one-to-one correspondence. When the read/write test is performed, the delay values in the plurality of transition registers are loaded into the plurality of shadow registers in a one-to-one correspondence. This greatly reduces adverse impact of the memory training process on performance of the processor. Optionally, when the read/write test is performed, the delay values in the plurality of transition registers may be loaded into the plurality of shadow registers in a one-to-one correspondence in a manner of hardware triggering.

Optionally, as shown in FIG. 8, the memory physical interface 211 includes the shadow register 2111 corresponding to the target signal, the initial training result further includes an initial center position of the sampling window of the target signal, the initial center position corresponds to one delay value, and before the first processor core 212 performs the training step, the delay value corresponding to the initial center position is in the shadow register 2111 corresponding to the target signal; and after determining the target center position of the sampling window of the target signal, the first processor core 212 is further configured to update the delay value in the shadow register 2111 by using a delay value corresponding to the target center position. In other words, the first processor core 212 uses the delay value corresponding to the target center position to update the delay value that is in the shadow register 2111 and that corresponds to the initial center position. In this way, it can be convenient for the second processor core 22 to perform read and write based on the delay value that is in the shadow register 2111 and that corresponds to the target center position. Optionally, as shown in FIG. 8, the memory physical interface 211 includes the transition register 2112 corresponding to the target signal, and the first processor core 212 is specifically configured to: after determining the target center position of the sampling window of the target signal, configure, in the transition register 2112, a delay value corresponding to the target center position, and then when the delay value corresponding to the target center position needs to be used to read/write data, load, into the shadow register 2111, the delay value that is in the transition register 2112 and that corresponds to the target center position. Therefore, time consumption in configuring the delay value in the shadow register 2111 can be reduced, and the delay value corresponding to the target center position is quickly updated to the shadow register 2111.

Optionally, as shown in FIG. 4, the computer system 10 further includes a non-volatile memory 40 connected to the processor 20, and the first processor core 212 is further configured to: after determining the target left boundary and the target right boundary of the sampling window of the target signal, store, in the non-volatile memory 40, a delay value corresponding to the target left boundary and a delay value corresponding to the target right boundary. Therefore, it can be convenient for the first processor core 212 to subsequently use the target left boundary as the initial left boundary and use the target right boundary as the initial right boundary to perform memory training on the computer system 10, and it can be ensured that when the computer system 10 is powered off, the delay value corresponding to the target left boundary and the delay value corresponding to the target right boundary are not lost. The non-volatile memory 40 may be a flash memory, a SATA hard disk, an SSD hard disk, a magnetic disk, or the like. Optionally, as shown in FIG. 4, the processor 20 further includes an input/output (I/O) controller 23, and the processor 20 is connected to the non-volatile memory 40 by using the I/O controller 23. For example, one end of the I/O controller 23 is connected to the second processor core 22, and the other end of the I/O controller 23 is connected to the non-volatile memory 40, so that the processor 20 is connected to the non-volatile memory 40 by using the I/O controller 23.

Optionally, as shown in FIG. 4, the processor 20 further includes the second processor core 22; before adjusting the timing relationship between the target signal and the synchronization signal of the target signal, the first processor core 212 is further configured to send a pause signal to the second processor core 22; and when receiving the pause signal, the second processor core 22 is configured to stop sending a read/write instruction to the memory chip (for example, the memory chip 30) connected to the processor 20. For example, before performing memory training on the computer system 10, the first processor core 212 sends the pause signal to the second processor core 22. In this embodiment of this application, because the process in which the first processor core 212 adjusts the timing relationship between the target signal and the synchronization signal of the target signal may affect the data read/write process of the second processor core 22, to avoid an error in the data read/write process of the second processor core 22, the first processor core 212 sends the pause signal to the second processor core 22 before adjusting the timing relationship between the target signal and the synchronization signal of the target signal. Therefore, in the process in which the first processor core 212 adjusts the timing relationship between the target signal and the synchronization signal of the target signal, the second processor core 22 stops sending read/write instruction to the memory chip 30, thereby stopping the data read/write process. In this embodiment of this application, the first processor core 212 sends the pause signal to the second processor core 22, so that the second processor core 22 stops the data read/write process. This is referred to as backpressure.

Optionally, after adjusting the timing relationship between the target signal and the synchronization signal, the first processor core 212 is further configured to send a resume signal to the second processor core 22; and when receiving the resume signal, the second processor core 22 is further configured to resume sending the read/write instruction to the memory chip (for example, the memory chip 30) connected to the processor 20. For example, after performing memory training on the computer system 10, the first processor core 212 sends the resume signal to the second processor core 22. In this embodiment of this application, after adjusting the timing relationship between the target signal and the synchronization signal, the first processor core 212 sends the resume signal to the second processor core 22, so that the second processor core 22 resumes sending the read/write instruction to the memory chip connected to the processor 20. This helps the second processor core 22 perform data read/write.

Optionally, the first processor core 212 is specifically configured to: before performing the read/write test of the target signal, send the pause signal to the second processor core 22; and after performing n read/write tests of the target signal, send the resume signal to the second processor core 22, where n 1, and n is an integer. As described above, it is easily understood that in the process in which the first processor core 212 adjusts the timing relationship between the target signal and the synchronization signal, a plurality of read/write tests need to be performed, and in the process of performing the read/write test, the second processor core 22 stops the data read/write process. To avoid inability of the second processor core 22 to perform data read/write for a relatively long time because it takes a relatively long time for the first processor core 212 to adjust the timing relationship between the target signal and the synchronization signal, in the process in which the first processor core 212 adjusts the timing relationship between the target signal and the synchronization signal, the first processor core 212 may send the resume signal to the second processor core 22 every time n read/write tests are performed (that is, n positions are tested), so that the second processor core 22 resumes the data read/write process. In this way, the process of adjusting the timing relationship between the target signal and the synchronization signal (for example, the memory training process) can be divided into a plurality of stages. This avoids adverse impact of relatively long time consumption in adjusting the timing relationship between the target signal and the synchronization signal on performance of the processor. Optionally, quantities of read/write tests performed by the first processor core 212 in the plurality of stages may be equal or unequal, that is, values of n may be the same or different in different stages. For example, n=3 in one stage and n=4 in another stage. This is not limited in this embodiment of this application.

Optionally, before sending the pause signal to the second processor core 22, the first processor core 212 is further configured to back up an operating parameter of the second processor core 22. In this way, it can be convenient for the second processor core 22 to restore the operating parameter of the second processor core 22 after the second processor core 22 receives the resume signal sent by the first processor core 212. As shown in FIG. 8, the memory physical interface 211 includes the transition register 2112 corresponding to the target signal; and before sending the pause signal to the second processor core 22, the first processor core 212 is specifically configured to back up the operating parameter of the second processor core 22 to the transition register 2112, thereby implementing fast backup of the operating parameter of the second processor core 22.

Optionally, the initial training result further includes the initial center position of the sampling window of the target signal, the initial center position corresponds to one delay value, and before the first processor core 212 performs the training step, the delay value corresponding to the initial center position is in the shadow register 2111 corresponding to the target signal; the second processor core 22 performs data read/write based on the delay value that is in the shadow register 2111 and that corresponds to the initial center position, and the operating parameter of the second processor core 22 may include the delay value corresponding to the initial center position; and the first processor core 212 is specifically configured to: before sending the pause signal to the second processor core 22, back up the delay value that is in the shadow register 2111 and that corresponds to the initial center position; and after performing the n read/write tests of the target signal and before sending the resume signal to the second processor core 22, load, into the shadow register 2111, the delay value that is backed up and that corresponds to the initial center position. Before sending the pause signal to the second processor core 22, the first processor core 212 backs up the delay value corresponding to the initial center position, and after performing the n read/write tests and before sending the resume signal to the second processor core 22, the first processor core 212 loads, into the shadow register 2111, the delay value that is backed up and that corresponds to the initial center position. Therefore, it can be convenient for the second processor core 22 to resume the data read/write process, and inability of the second processor core 22 to continue to perform data read/write due to the memory training process can be avoided.

Optionally, the first processor core 212 is specifically configured to: before sending the pause signal to the second processor core 22, back up, to the transition register 2112, the delay value that is in the shadow register 2111 and that corresponds to the initial center position; and after performing the n read/write tests of the target signal and before sending the resume signal to the second processor core 22, load, into the shadow register 2111, the delay value that is backed up in the transition register 2112 and that corresponds to the initial center position. In other words, in this embodiment of this application, the transition register 2112 is used to implement backup of the delay value corresponding to the initial center position. As described above, in this embodiment of this application, the delay value corresponding to the boundary of the sampling window is further configured in the shadow register 2111 by using the transition register 2112. Therefore, it can be understood that in this embodiment of this application, swapping between a new delay value (the delay value corresponding to the boundary of the sampling window) and an initial delay value (the delay value corresponding to the initial center position) is implemented by using the transition register 2112.

Optionally, with continued reference to FIG. 4, the memory controller 21 further includes a storage circuit 214, where the storage circuit 214 is connected to the first processor core 212; the processor 20 further includes the second processor core 22; the second processor core 22 is connected to the storage circuit 214; the second processor core 22 is further configured to write call information to the storage circuit 214; and in the running process of the computer system 10 after the computer system 10 is started, the first processor core 212 is specifically configured to read the call information from the storage circuit 214 and execute an instruction in the call information. The call information is information used to adjust the timing relationship between the target signal and the synchronization signal (for example, implement memory training). The first processor core 212 may adjust the timing relationship between the target signal of the memory physical interface 211 and the synchronization signal of the target signal by executing the call information. The second processor core 22 may be the master processor core of the processor 20, and the first processor core 212 may be the slave processor core of the processor 20. The first processor core 212 may be a logic circuit (or module) having a logic computing capability, and can adjust the timing relationship between the target signal and the synchronization signal of the target signal based on a call by the second processor core 22.

Figure 9:
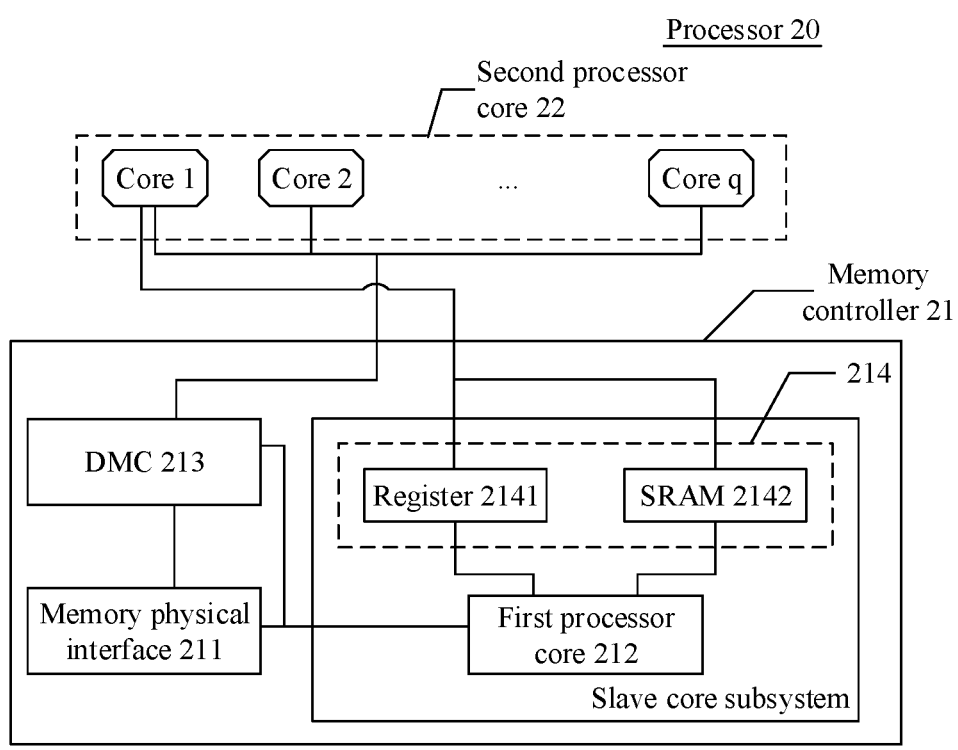
FIG. 9 is a schematic diagram of a structure of a processor according to an embodiment of this application.

Optionally, the second processor core 22 includes at least one core, where the at least one core may include a master core. That the second processor core 22 is connected to the storage circuit 214 may be that the master core in the second processor core 22 is connected to the storage circuit 214, and that the second processor core 22 writes call information to the storage circuit 214 may be that the master core in the second processor core 22 writes the call information to the storage circuit 214. For example, FIG. 9 is a schematic diagram of a structure of the processor 20 according to an embodiment of this application. As shown in FIG. 9, the second processor core 22 includes a core 1 to a core q, where the core 1 is a master core of the second processor core 22, the core 1 is connected to the storage circuit 214, and the core 1 is configured to write call information to the storage circuit 214. Optionally, a command interface is defined between the core 1 and the storage circuit 214, and the core 1 can write the call information in a form of a command to the storage circuit 214 through the command interface.

Optionally, the storage circuit 214 includes at least one of a register and a SRAM. In this embodiment of this application, an example in which the storage circuit 214 includes the register and the SRAM is used for description. As shown in FIG. 9, the first processor core 212 is separately connected to the register 2141, the SRAM 2142, the DMC 213, and the memory physical interface 211, so that the first processor core 212 can read the call information from the register 2141 and the SRAM 2142, and adjust the timing relationship between the target signal of the memory physical interface 211 and the synchronization signal of the target signal based on the call information by interacting with the DMC 213 and the memory physical interface 211 for memory training. The second processor core 22 is separately connected to the register 2141, the SRAM 2142, and the DMC 213, so that the second processor core 22 can write the call information to the register 2141 and the SRAM 2142 and interact with the DMC 213 to perform data read/write. As shown in FIG. 9, the master core 1 in the second processor core 22 is separately connected to the register 2141 and the SRAM 2142.

Optionally, after writing the call information to the storage circuit 214, the second processor core 22 may further write de-assert reset information to the storage circuit 214. After reading the de-assert reset information, the first processor core 212 reads the call information from the storage circuit 214 and executes an instruction in the call information. Generally, the second processor core 22 may write the de-assert reset information and the call information to different positions in the storage circuit 214. For example, the second processor core 22 may write the de-assert reset information to a flag bit of the register 2141 and write the call information to the SRAM 2142. For example, an initial level of the flag bit in the register 2141 may be 0, and after the de-assert reset information is written, the level of the flag bit changes to 1. The first processor core 212 may periodically read the level of the flag bit. After the level of the flag bit changes from 0 to 1, the first processor core 212 determines that the second processor core 22 has written the call information to the SRAM 2142, and the first processor core 212 may read the call information from the SRAM 2142 and execute an instruction in the call information.

Optionally, firmware of the first processor core 212 is stored in the non-volatile memory 40 connected to the processor 20 and is updatable, and the firmware includes the call information. The firmware of the first processor core 212 may be stored in the non-volatile memory 40 before the computer system 10 is powered on, and the second processor core 22 may write the firmware of the first processor core 212 from the non-volatile memory 40 to the storage circuit 214 when the computer system 10 is powered on. The second processor core 22 may be the master processor core of the processor 20, and the second processor core 22 may update the firmware of the first processor core 212 to update a function of the first processor core 212. For example, firmware of the first processor core 212 includes the call information used to adjust the timing relationship between the target signal and the synchronization signal, and the call information can be updated by updating the firmware of the first processor core 212. For example, the call information may be a segment of program code containing at least one instruction, and the second processor core 22 can add, remove, or modify instructions in the call information by updating the firmware of the first processor core 212, so that extension of memory training and flexible configuration can be implemented.

Optionally, the memory controller 21 includes at least one memory channel and at least one first processor core, where each memory channel includes the memory physical interface, the memory physical interface in each memory channel is connected to at least one memory chip, and the memory physical interface in the at least one memory channel is connected to the at least one first processor core; and in the running process of the computer system after the computer system is started, the at least one first processor core is configured to adjust the timing relationship between target signal of the memory physical interface in the at least one memory channel and the synchronization signal of the target signal. Optionally, the memory controller 21 includes at least one slave core subsystem, and each slave core subsystem includes a first processor core and a storage circuit. Each memory channel includes a DMC and a memory physical interface, and the memory physical interface in each memory channel is connected to the DMC in the memory channel. The DMC and the memory physical interface in the at least one memory channel are connected to the first processor core of the at least one slave core subsystem. It should be noted that a quantity of slave core subsystems in the memory controller 21 is not limited in this embodiment of this application. For example, the memory controller 21 includes only one slave core subsystem, DMCs and memory physical interfaces in all memory channels of the memory controller 21 are connected to the first processor core of the slave core subsystem, and a first processor core of the slave core subsystem adjusts timing relationships of signals transmitted by using all the memory physical interfaces. For another example, memory channels are in a one-to-one correspondence with slave core subsystems, each memory channel includes one slave core subsystem, and a first processor core in each slave core subsystem is configured to adjust a timing relationship of signals transmitted by using a memory physical interface in a corresponding memory channel in the running process of the computer system after the computer system is started. The memory physical interface may be a PHY.

Figure 10:
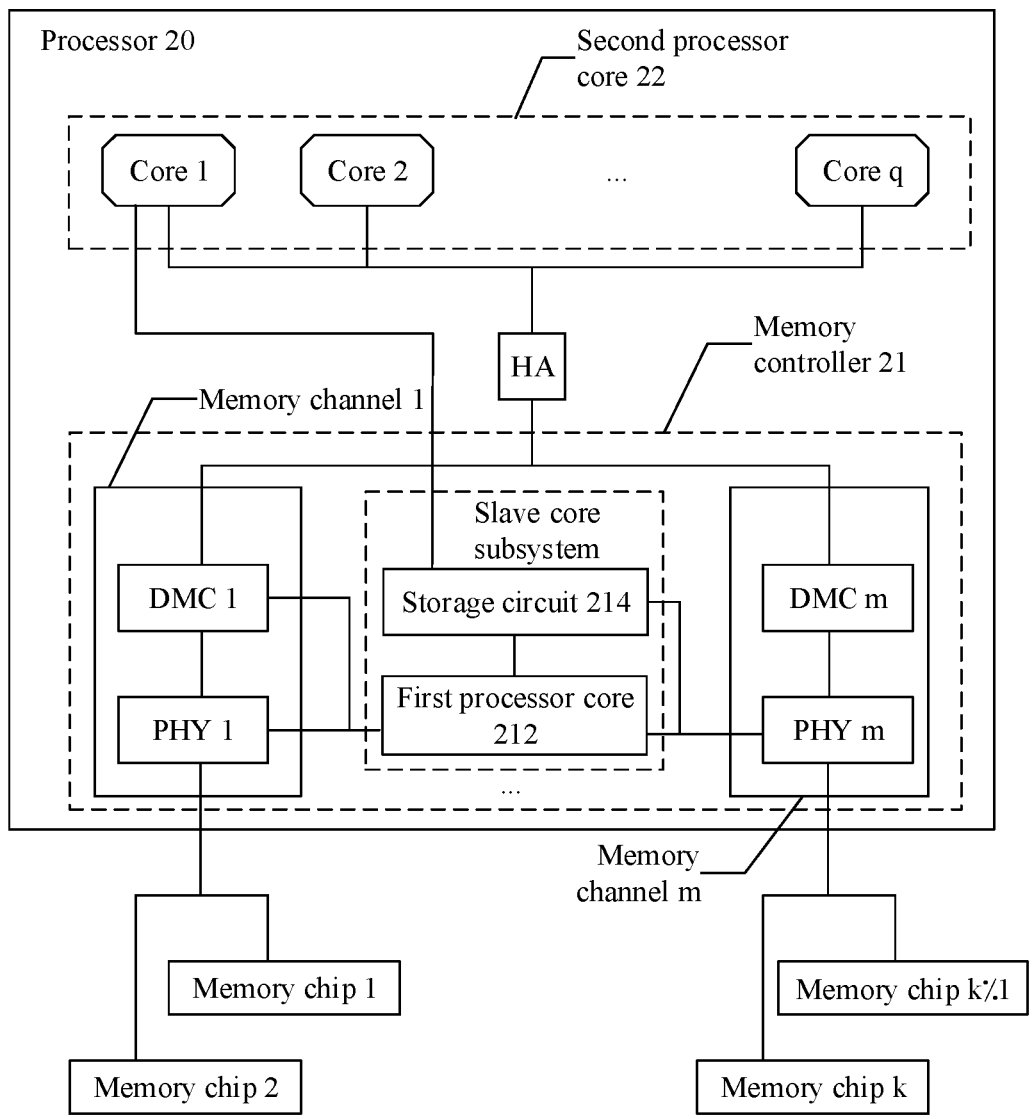
FIG. 10 is a schematic diagram of a structure of another computer system according to an embodiment of this application.

For example, FIG. 10 is a schematic diagram of a structure of another computer system 10 including a processor 20 according to an embodiment of this application. The computer system 10 further includes at least one memory chip. The processor 20 includes a memory controller 21 and a second processor core 22. The memory controller 21 includes at least one memory channel and one slave core subsystem. Each of the at least one memory channel includes a DMC and a PHY. The slave core subsystem includes a first processor core 212 and a storage circuit 214. FIG. 10 is described by using an example in which the at least one memory chip includes memory chips 1–k, and the at least one memory channel includes memory channels 1–m, and each PHY is connected to two memory chips. A structure and function of each of the at least one memory chip may be the same as those of the foregoing memory chip 30. As shown in FIG. 10, the memory channel 1 includes a DMC 1 and a PHY 1; the DMC 1 is separately connected to the second processor core 22 and the PHY 1; the PHY 1 is separately connected to the memory chip 1 and the memory chip 2; the memory channel m includes a DMC m and a PHY m; the DMC m is separately connected to the second processor core 22 and the PHY m; the PHY m is separately connected to the memory chip k−1 and the memory chip k; the DMCs 1–m and the PHYs 1–m are separately connected to the first processor core 212; the storage circuit 214 is connected to the second processor core 22; and specifically, the storage circuit 214 is connected to a master core 1 of the second processor core 22. The first processor core 212 is configured to adjust, through memory training, timing relationships of signals transmitted by using the PHYs 1–m, so that timing alignment is achieved between target signals transmitted by using the PHYs 1–m and synchronization signals of the target signals. For example, through memory training, the first processor core 212 adjusts a timing relationship between a target signal (for example, a DQ signal) transmitted by the DMC 1 to the memory chip 1 and the memory chip 2 through the PHY 1 and a synchronization signal (for example, a DQS signal) of the target signal, and adjusts a timing relationship between a target signal (for example, a DQ signal) transmitted by the memory chip 1 and the memory chip 2 to the DMC 1 through the PHY 1 and a synchronization signal (for example, a DQS signal) of the target signal. For another example, through memory training, the first processor core 212 adjusts a timing relationship between a target signal (for example, a DQ signal) transmitted by the DMC m to the memory chip k−1 and the memory chip k through the PHY m and a synchronization signal (for example, a DQS signal) of the target signal, and adjusts a timing relationship between a target signal (for example, a DQ signal) transmitted by the memory chip k−1 and the memory chip k to the DMC m through the PHY m and a synchronization signal (for example, a DQS signal) of the target signal. In this embodiment of this application, memory training performed on the computer system may be understood as memory training performed on a memory channel in the computer system. In the computer system 10 provided in the embodiment shown in FIG. 10, the first processor core 212 performs memory training on the memory channel 1 to the channel m to adjust the timing relationships of the signals transmitted by using the PHYs 1–m. In one example, the first processor core 212 may perform memory training on the memory channel 1 to the memory channel m sequentially. For example, the first processor core 212 first performs memory training on the memory channel 1, and finally performs memory training on the memory channel m. In another example, the first processor core 212 may perform memory training on the memory channel 1 to the memory channel m simultaneously. This is not limited in this embodiment of this application.

Figure 11:
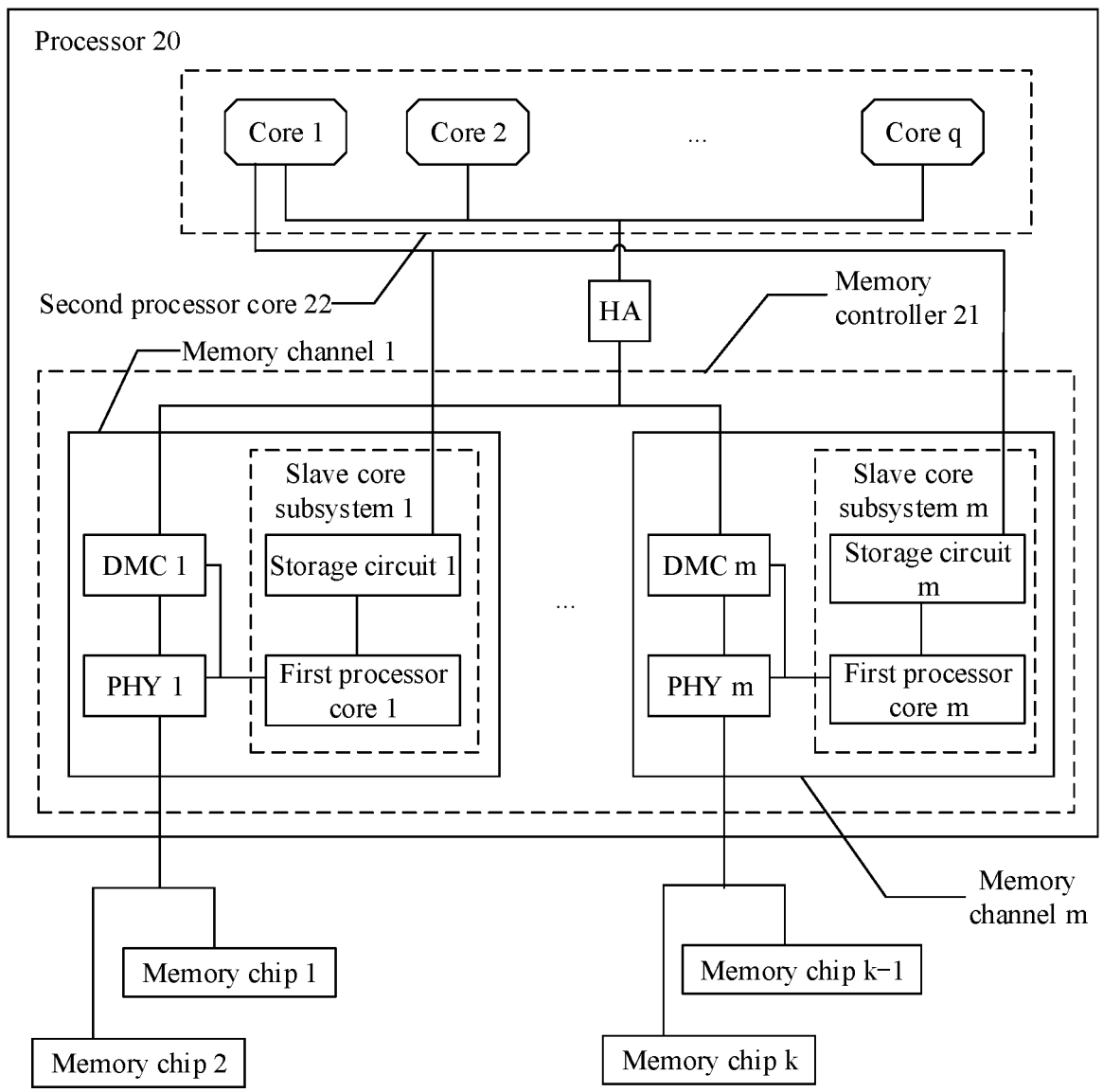
FIG. 11 is a schematic diagram of a structure of still another computer system according to an embodiment of this application.

For example, FIG. 11 is a schematic diagram of a structure of still another computer system 10 including a processor 20 according to an embodiment of this application. The computer system 10 further includes at least one memory chip. The processor 20 includes a memory controller 21 and a second processor core 22. The memory controller 21 includes at least one memory channel and at least one slave core subsystem. The at least one memory channel is in a one-to-one correspondence with the at least one slave core subsystem. Each of the at least one memory channel includes a DMC and a PHY. FIG. 11 is described by using an example in which the at least one memory chip includes memory chips 1–k, and the at least one memory channel includes memory channels 1–m, and the at least one slave core subsystem includes slave core subsystems 1–m, and each PHY is connected to two memory chips. It should be noted that a structure and function of each of the at least one memory chip may be the same as those of the foregoing memory chip 30. As shown in FIG. 11, the memory channel 1 includes a DMC 1 and a PHY 1; the DMC 1 is separately connected to the second processor core 22 and the PHY 1; the PHY 1 is separately connected to the memory chip 1 and the memory chip 2; the slave core subsystem 1 corresponds to the memory channel 1; the slave core subsystem 1 is located in the memory channel 1; a first processor core 1 in the slave core subsystem 1 is separately connected to the DMC 1, the PHY 1, and a storage circuit 1 in the slave core subsystem 1; and the storage circuit 1 is connected to the second processor core 22. Specifically, the storage circuit 1 is connected to a master core 1 of the second processor core 22; and through memory training, the first processor core 1 adjusts a timing relationship between a target signal (for example, a DQ signal) transmitted by the DMC 1 to the memory chip 1 and the memory chip 2 through the PHY 1 and a synchronization signal (for example, a DQS signal) of the target signal, and adjusts a timing relationship between a target signal (for example, a DQ signal) transmitted by the memory chip 1 and the memory chip 2 to the DMC 1 through the PHY 1 and a synchronization signal (for example, a DQS signal) of the target signal. The memory channel m includes a DMC m and a PHY m; the DMC m is separately connected to the second processor core 22 and the PHY m; the PHY m is separately connected to the memory chip k−1 and the memory chip k; the slave core subsystem m corresponds to the memory channel m; the slave core subsystem m is located in the memory channel m; a first processor core m in the slave core subsystem m is separately connected to the DMC m, the PHY m, and a storage circuit m in the slave core subsystem m; and the storage circuit m is connected to the second processor core 22. Specifically, the storage circuit m is connected to the master core 1 of the second processor core 22; and through memory training, the first processor core m adjusts a timing relationship between a target signal (for example, a DQ signal) transmitted by the DMC m to the memory chip k−1 and the memory chip k through the PHY m and a synchronization signal (for example, a DQS signal) of the target signal, and adjusts a timing relationship between a target signal (for example, a DQ signal) transmitted by the memory chip k−1 and the memory chip k to the DMC m through the PHY m and a synchronization signal (for example, a DQS signal) of the target signal. In this embodiment of this application, memory training performed on the computer system may be understood as memory training performed on a memory channel in the computer system. In the computer system provided in the embodiment shown in FIG. 11, the first processor core 1 performs memory training on the memory channel 1, and the first processor core m performs memory training on the memory channel m.

Figure 12:
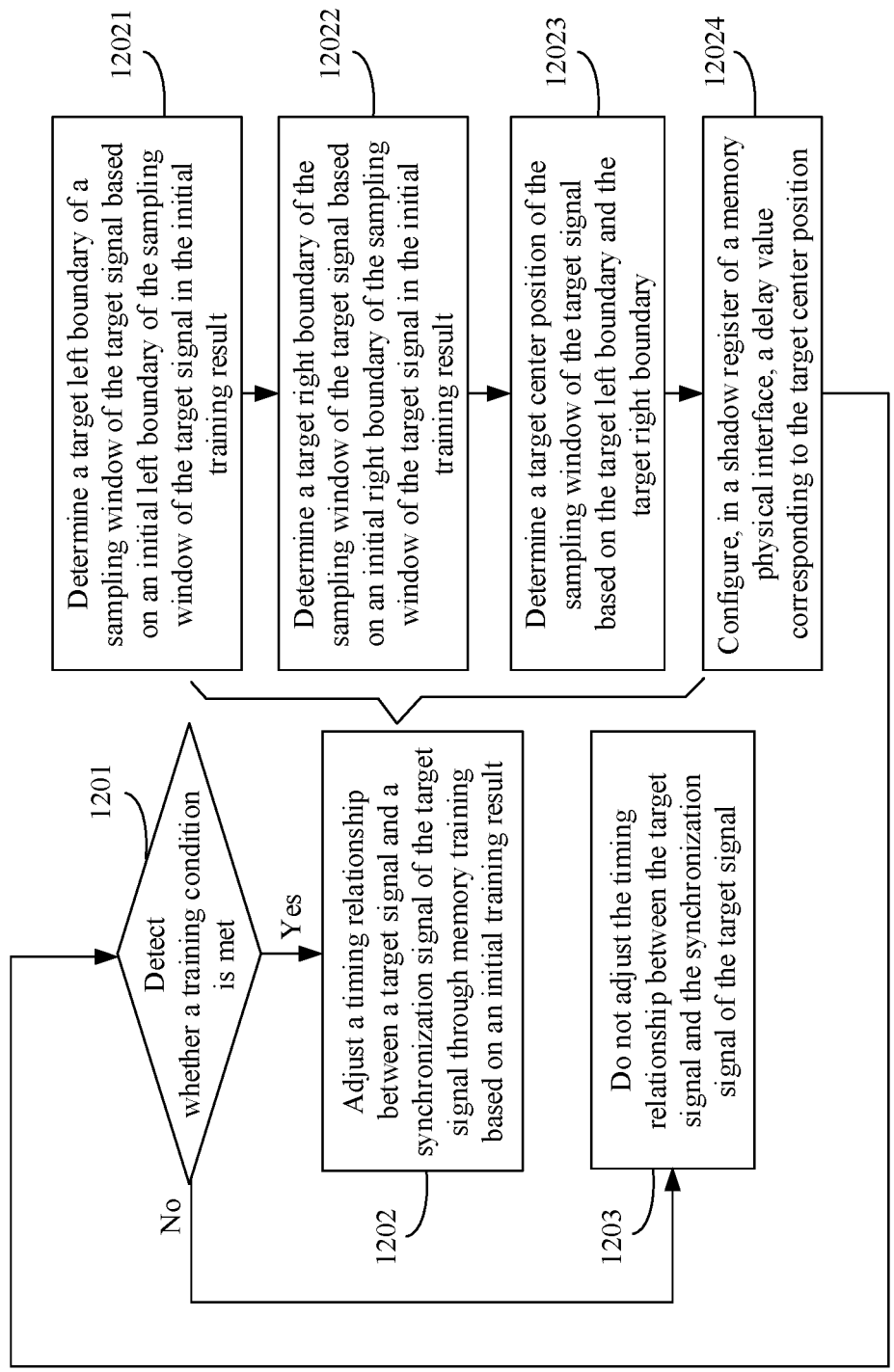
FIG. 12 is a flowchart of a signal adjustment method according to an embodiment of this application.

It should be noted that the computer systems shown in FIG. 11 and FIG. 12 are merely examples, and that the computer system may further include a non-volatile memory. The processor in the computer system may further include an I/O controller, and the non-volatile memory is connected to the second processor core of the processor by using the I/O controller. A person skilled in the art easily understands that, in this embodiment of this application, an example in which the first processor core in the slave core subsystem adjusts a timing relationship between a target signal and a synchronization signal of the target signal through memory training is used for description. In an actual application, a function of the slave core subsystem is not limited to memory training. For example, in a process of starting the computer system, the first processor core in the slave core subsystem may further initialize the computer system. In a running process of the computer system after the computer system is started, the first processor core in the slave core subsystem may further adjust a refresh rate of a memory chip adjust a clock frequency of the processor, and the like based on a change of an external factor. As long as corresponding call information is stored in the storage circuit of the slave core subsystem, the slave core subsystem can implement the corresponding function. Details are not described herein again in this embodiment of this application.

In summary, in the processor provided in this embodiment of this application, in the running process of the computer system including the processor after the computer system is started, the first processor core in the memory controller of the processor can adjust the timing relationship between the target signal of the memory physical interface and the synchronization signal of the target signal. This helps ensure timing alignment between the target signal and the synchronization signal of the target signal and therefore helps ensure correctness and reliability of sampling performed on the target signal. In addition, the first processor core adjusts the timing relationship between the target signal and the synchronization signal through memory training based on the initial training result. Therefore, in the process in which the first processor core adjusts the timing relationship between the target signal and the synchronization signal, only a few delay values need to be tested. This helps reduce time consumption in adjusting the timing relationship between the target signal and the synchronization signal and can avoid adverse impact of the process of adjusting the timing relationship between the target signal and the synchronization signal on performance of the processor. In addition, in this embodiment of this application, a transition register is introduced, and the transition register is used to configure a delay value in a shadow register during a read/write test. This helps avoid adverse impact of relatively long time consumption in configuring the delay value in the shadow register on performance of the processor.

Based on the same inventive concept, an embodiment of this application provides a signal adjustment method. The following describes the signal adjustment method provided in this embodiment of this application.

The signal adjustment method provided in this embodiment of this application may be applied to the foregoing processor, where the processor includes a memory controller, the memory controller includes a memory physical interface and a first processor core, and the first processor core is connected to the memory physical interface. The method includes: in a running process of a computer system including the processor after the computer system is started, the first processor core adjusts a timing relationship between a target signal of the memory physical interface and a synchronization signal of the target signal, where both the target signal and the synchronization signal are signals transmitted by using the memory physical interface. For example, when the target signal is a DQ signal or a DM signal, the synchronization signal is a DQS signal, or when the target signal is a CTL signal or a CMD signal, the synchronization signal is a CK signal.

Optionally, the memory controller further includes a storage circuit, where the storage circuit is connected to the first processor core; the processor further includes a second processor core, where the second processor core may be a master processor core of the processor; the second processor core may write call information to the storage circuit; and in the running process of the computer system after the computer system is started, the first processor core may read the call information from the storage circuit and execute an instruction in the call information, to adjust the timing relationship between the target signal and the synchronization signal, where the call information is information used to adjust the timing relationship between the target signal of the memory physical interface and the synchronization signal of the target signal. The storage circuit includes at least one of a register and a static random access memory. Optionally, firmware of the first processor core is stored in a non-volatile memory connected to the processor and is updatable, and the firmware includes the call information. The second processor core can update the firmware of the first processor core, so that extension of memory training and flexible configuration can be implemented. The non-volatile memory may be a flash memory, a SATA hard disk, an SSD hard disk, a magnetic disk, or the like.

Optionally, in the running process of the computer system after the computer system is started, when a training condition is met, the first processor core may adjust the timing relationship between the target signal and the synchronization signal through memory training. The training condition includes at least one of the following: duration from previous memory training reaches first preset duration; a delay variation detected by a delay detection circuit on a memory chip connected to the processor is greater than a preset variation; and duration in which the memory chip connected to the processor is in an idle state reaches second preset duration. In the running process of the computer system including the processor after the computer system is started, the processor may detect whether a training condition is met. When the training condition is met, the first processor core adjusts the timing relationship between the target signal and the synchronization signal through memory training; or when the training condition is not met, the first processor core does not adjust the timing relationship between the target signal and the synchronization signal, and the processor may continue to detect whether the training condition is met. Optionally, the first processor core may detect whether the training condition is met. Alternatively, the second processor core of the processor may detect whether the training condition is met. This is not limited in this embodiment of this application.

Optionally, in the running process of the computer system after the computer system is started, the first processor core adjusts the timing relationship between the target signal and the synchronization signal through memory training based on an initial training result, where the initial training result is a training result obtained by performing memory training on the computer system before current memory training is performed. In this embodiment of this application, the initial training result may include an initial left boundary and an initial right boundary of a sampling window of the target signal; and the first processor core may adjust the timing relationship between the target signal and the synchronization signal through memory training based on the initial training result by performing the following training step, where the training step includes: determining a target left boundary of the sampling window of the target signal based on the initial left boundary; determining a target right boundary of the sampling window of the target signal based on the initial right boundary; and determining a target center position of the sampling window of the target signal based on the target left boundary and the target right boundary. For example, the target center position is aligned with a sampling edge of the synchronization signal, and a delay of the target center position relative to the sampling edge of the synchronization signal is 0, that is, a moment at which the target center position is located is the same as a moment at which the sampling edge of the synchronization signal is located.

Optionally, that the first processor core determines a target left boundary of the sampling window of the target signal based on the initial left boundary may include: the first processor core performs a read/write test of the target signal based on the initial left boundary; and if the read/write test succeeds, the first processor core adjusts the left boundary of the sampling window to the left by a target step length, and performs a read/write test of the target signal based on an adjusted left boundary, until the read/write test fails; and the first processor core determines a left boundary previous to a left boundary at which the read/write test fails, as the target left boundary of the sampling window; or if the read/write test fails, the first processor core adjusts the left boundary of the sampling window to the right by a target step length, and performs a read/write test of the target signal based on an adjusted left boundary, until the read/write test fails; and the first processor core determines a left boundary previous to a left boundary at which the read/write test fails, as the target left boundary of the sampling window.

Optionally, that the first processor core determines a target right boundary of the sampling window of the target signal based on the initial right boundary may include: the first processor core performs a read/write test of the target signal based on the initial right boundary; and if the read/write test succeeds, the first processor core adjusts the right boundary of the sampling window to the right by a target step length, and performs a read/write test of the target signal based on an adjusted right boundary, until the read/write test fails; and the first processor core determines a right boundary previous to a right boundary at which the read/write test fails, as the target right boundary of the sampling window; or if the read/write test fails, the first processor core adjusts the right boundary of the sampling window to the left by a target step length, and performs a read/write test of the target signal based on an adjusted right boundary, until the read/write test fails; and the first processor core determines a right boundary previous to a right boundary at which the read/write test fails, as the target right boundary of the sampling window.

In this embodiment of this application, before performing the read/write test of the target signal based on the left boundary (or the right boundary), the first processor core needs to configure, in a shadow register corresponding to the target signal in the memory physical interface, a delay value corresponding to the left boundary (or the right boundary). However, configuring the delay value directly in the shadow register of the memory physical interface easily affects performance of the processor. Therefore, in this embodiment of this application, a transition register corresponding to the target signal is added to the memory physical interface; before performing each read/write test of the target signal, the first processor core configures, in the transition register corresponding to the target signal, a delay value corresponding to a boundary of the sampling window based on which the current read/write test is performed; and when performing each read/write test of the target signal, the first processor core loads the delay value in the transition register corresponding to the target signal into the shadow register corresponding to the target signal. In this way, the first processor core can perform the read/write test of the target signal based on the delay value that is in the shadow register corresponding to the target signal and that corresponds to the boundary of the sampling window when the current read/write test of the target signal is performed.

Optionally, the memory physical interface includes the shadow register corresponding to the target signal, the initial training result further includes an initial center position of the sampling window of the target signal, the initial center position corresponds to one delay value, and before the first processor core performs the training step, the delay value corresponding to the initial center position is in the shadow register; and the method further includes: after determining the target center position of the sampling window of the target signal, the first processor core updates the delay value in the shadow register by using a delay value corresponding to the target center position. In this way, it can be convenient for the second processor core to perform data read/write based on a trained delay value that is stored in the shadow register and that corresponds to the target center position, that is, it is convenient for the second processor core to apply the training result to achieve accurate sampling of the target signal.

Optionally, the method further includes: after determining the target left boundary and the target right boundary of the sampling window of the target signal, the first processor core stores, in the non-volatile memory connected to the processor, a delay value corresponding to the target left boundary and a delay value corresponding to the target right boundary. Therefore, it can be convenient for the first processor core to subsequently use the target left boundary as the initial left boundary and use the target right boundary as the initial right boundary to perform memory training on the computer system, and it can be ensured that when the computer system is powered off, the delay value corresponding to the target left boundary and the delay value corresponding to the target right boundary are not lost.

Optionally, the processor further includes the second processor core; and the method further includes: before adjusting the timing relationship between the target signal and the synchronization signal, the first processor core sends a pause signal to the second processor core; and the second processor core stops, based on the received pause signal, sending a read/write instruction to the memory chip connected to the processor. Therefore, the first processor core can implement backpressure on the second processor core, and this avoids a conflict between the process in which the first processor core adjusts the timing relationship between the target signal and the synchronization signal and a process of accessing the memory chip by the second processor core.

Optionally, after adjusting the timing relationship between the target signal and the synchronization signal, the first processor core sends a resume signal to the second processor core; and the second processor core resumes, based on the received resume signal, sending the read/write instruction to the memory chip connected to the processor. Therefore, the first processor core can stop backpressure on the second processor core, so that the second processor core can continue to access the memory chip.

Optionally, that the first processor core sends a pause signal to the second processor core before adjusting the timing relationship between the target signal and the synchronization signal may include: before performing the read/write test of the target signal, the first processor core sends the pause signal to the second processor core; and that the first processor core sends a resume signal to the second processor core after adjusting the timing relationship between the target signal and the synchronization signal may include: after performing n read/write tests of the target signal, the first processor core sends the resume signal to the second processor core, where n 1, and n is an integer. Therefore, the first processor core can perform the process of adjusting the timing relationship between the target signal and the synchronization signal stage by stage. This avoids adverse impact of relatively long time consumption in adjusting the timing relationship between the target signal and the synchronization signal on performance of the processor.

Optionally, before sending the pause signal to the second processor core, the first processor core backs up an operating parameter of the second processor core. In this way, it can be convenient for the second processor core to restore the operating parameter of the second processor core. For example, the memory physical interface includes the transition register corresponding to the target signal; and the first processor core can back up the operating parameter of the second processor core to the transition register to implement fast backup of the operating parameter of the second processor core.

Optionally, the initial training result further includes the initial center position of the sampling window of the target signal, the initial center position corresponds to one delay value, and before the first processor core performs the training step, the delay value corresponding to the initial center position is stored in the shadow register corresponding to the target signal; the operating parameter of the second processor core may include one delay value corresponding to the initial center position; before sending the pause signal to the second processor core, the first processor core can back up the delay value that is stored in the shadow register and that corresponds to the initial center position; and after performing the n read/write tests of the target signal and before sending the resume signal to the second processor core, the first processor core loads, into the shadow register, the delay value that is backed up and that corresponds to the initial center position. For example, before sending the pause signal to the second processor core, the first processor core backs up, to the transition register, the delay value that is stored in the shadow register and that corresponds to the initial center position; and after performing the n read/write tests of the target signal and before sending the resume signal to the second processor core, the first processor core loads, into the shadow register, the delay value that is backed up in the transition register and that corresponds to the initial center position. In this way, after the first processor core completes the read/write test, it can be convenient for the second processor core of the processor to resume work before the read/write test. In this embodiment of this application, the transition register is used to back up the delay value in the shadow register, so that fast backup can be implemented.

The following describes a signal adjustment method provided in an embodiment of this application with reference to an accompanying drawing. For example, FIG. 12 is a flowchart of a signal adjustment method according to an embodiment of this application. Referring to FIG. 12, the signal adjustment method may include the following steps.

Step 1201: In a running process of a computer system after the computer system is started, a first processor core detects whether a training condition is met, and if the training condition is met, performs step 1202, or if the training condition is not met, performs step 1203.

The training condition includes at least one of the following: duration from previous memory training reaches first preset duration; a delay variation detected by a delay detection circuit on a memory chip connected to a processor is greater than a preset variation; and duration in which the memory chip connected to the processor is in an idle state reaches second preset duration. For the process in which the first processor core detects whether the training condition is met, refer to the foregoing embodiment of the processor. Details are not described herein again.

Step 1202: The first processor core adjusts a timing relationship between a target signal and a synchronization signal of the target signal through memory training based on an initial training result.

If the first processor core determines that the training condition is met, the first processor core performs memory training on the computer system based on the initial training result of the computer system to adjust the timing relationship between the target signal and the synchronization signal of the target signal. The initial training result includes an initial left boundary and an initial right boundary of a sampling window of the target signal. As shown in FIG. 12, that the first processor core adjusts a timing relationship between a target signal and a synchronization signal of the target signal through memory training based on an initial training result may include the following substep 12021 to substep 12024.

Substep 12021: The first processor core determines a target left boundary of the sampling window of the target signal based on the initial left boundary of the sampling window of the target signal in the initial training result.

For an implementation process of substep 12021, refer to the embodiment shown in FIG. 5. Details are not described herein again.

Substep 12022: The first processor core determines a target right boundary of the sampling window of the target signal based on the initial right boundary of the sampling window of the target signal in the initial training result.

For an implementation process of substep 12022, refer to the embodiment shown in FIG. 6. Details are not described herein again.

Substep 12023: The first processor core determines a target center position of the sampling window of the target signal based on the target left boundary and the target right boundary.

The target center position is aligned with a sampling edge of the synchronization signal. For example, a delay of the target center position relative to the sampling edge of the synchronization signal is 0, that is, a moment at which the target center position is located is the same as a moment at which the sampling edge of the synchronization signal is located. The first processor core may determine a center position between the target left boundary and the target right boundary as the target center position. Optionally, the target left boundary and the target right boundary respectively correspond to one delay value, where the delay value is a delay value of the target signal relative to the synchronization signal of the target signal, and the first processor core divides a sum of the delay value corresponding to the target left boundary and the delay value corresponding to the target right boundary by 2 to obtain the delay value corresponding to the target center position.

Substep 12024: The first processor core configures, in a shadow register of a memory physical interface, the delay value corresponding to the target center position.

Optionally, the first processor core first configures, in a transition register corresponding to the target signal, the delay value corresponding to the target center position, and then when the delay value corresponding to the target center position needs to be used to perform data read/write, the first processor core loads, into the shadow register corresponding to the target signal, the delay value that is stored in the transition register and that corresponds to the target center position. Therefore, the delay value corresponding to the target center position can be quickly updated to the shadow register. This avoids adverse impact of the process of configuring, in the shadow register, the delay value corresponding to the target center position, on performance of the processor.

In this embodiment of this application, after the first processor core configures, in the shadow register of the memory physical interface, the delay value corresponding to the target center position, the first processor core continues to perform step 1201 to detect whether the training condition is met, and performs step 1202 again when the training condition is met. This is not limited in this embodiment of this application.

Step 1203: The first processor core does not adjust the timing relationship between the target signal and the synchronization signal of the target signal.

If the first processor core determines that the training condition is not met, the first processor core does not perform memory training on the computer system, and does not adjust the timing relationship between the target signal and the synchronization signal of the target signal. The first processor core continues to perform step 1201 to detect whether the training condition is met.

A person skilled in the art easily understands that mutual reference may be made between the embodiment of the signal adjustment method provided in this embodiment of this application and the foregoing embodiment of the processor, and that reference may be made to the foregoing embodiment of the processor for details not disclosed in the embodiment of the signal adjustment method. Details are not described herein again in this embodiment of this application.

In summary, in the signal adjustment method provided in this embodiment of this application, in the running process of the computer system including the processor after the computer system is started, the first processor core in a memory controller of the processor can adjust the timing relationship between the target signal of the memory physical interface and the synchronization signal of the target signal. This helps ensure timing alignment between the target signal and the synchronization signal and therefore helps ensure correctness and reliability of sampling performed on the target signal. In addition, the first processor core adjusts the timing relationship between the target signal and the synchronization signal through memory training based on the initial training result. Therefore, in the process in which the first processor core adjusts the timing relationship between the target signal and the synchronization signal, only a few delay values need to be tested. This helps reduce time consumption in adjusting the timing relationship between the target signal and the synchronization signal and can avoid adverse impact of the process of adjusting the timing relationship between the target signal and the synchronization signal on performance of the processor. In addition, in this embodiment of this application, the transition register is introduced, and the transition register is used to configure the delay value in the shadow register during a read/write test. This helps avoid adverse impact of relatively long time consumption in configuring the delay value in the shadow register on performance of the processor.

Based on the same technical concept, an embodiment of this application further provides a computer system, where the computer system may include the processor provided in any one of the foregoing embodiments and a memory chip coupled to the processor. For example, the computer system may be a computer motherboard, or may be an electronic device such as a notebook computer, a mobile phone, or a digital camera. This is not limited in this embodiment of this application.

All or some of the foregoing embodiments may be implemented by using software, hardware, firmware, or any combination thereof. When all or some of the foregoing embodiments are implemented by using software, the embodiments may be implemented all or partially in a form of a computer program product, where the computer program product includes one or more computer instructions. When the computer program instructions are loaded and executed on a computer, the procedures or functions according to embodiments of this application are all or partially generated. The computer may be a general purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this application, the terms "first", "second", and the like are merely used for a purpose of description, and shall not be understood as an indication or implication of relative importance. The term "at least one" means one or more, and the term "a plurality of" means two or more, unless otherwise expressly defined. The term "at least one" means one or more, and the term "a plurality of" means two or more, unless otherwise expressly defined.

Mutual reference may be made between different types of embodiments such as the method embodiments and apparatus embodiments provided in embodiments of this application. This is not limited in embodiments of this application. An order of operations in the method embodiments provided in embodiments of this application can be properly adjusted, and operations can also be added or removed accordingly based on situations. Any variation of the method readily figured out by a person skilled in the art within the technical scope disclosed in this application shall fall within the protection scope of this application. Therefore, details are not described herein.

In the corresponding embodiments provided in this application, it should be understood that the disclosed apparatus or the like may be implemented with other composition. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

Units described as separate parts may or may not be physically separate and parts described as units may or may not be physical units, that is, they may be located in one position or distributed on a plurality of network devices (for example, terminal devices). Some or all of the units may be selected based on actual requirements to achieve the objectives of the solutions of embodiments.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A processor comprising:
   a memory controller, comprising:
   a memory physical interface and
   a first processor core connected to the memory physical interface, wherein the processor is comprised in a computer system;
   after the computer system is started and during a running process of the computer system, the first processor core is configured to adjust a timing relationship between a target signal of the memory physical interface and a synchronization signal of the target signal,
   wherein both the target signal and the synchronization signal are signals transmitted by using the memory physical interface, the timing relationship between the target signal and the synchronization signal is adjusted through memory training based on an initial training result, and the memory training comprises determining a target center position of a sampling window of the target signal based on a target left boundary and a target right boundary.

2. The processor according to claim 1, wherein after the computer system is started and during the running process of the computer system, based on a training condition being met, the first processor core is configured to adjust the timing relationship between the target signal and the synchronization signal through the memory training.

3. The processor according to claim 2, wherein the training condition comprises at least one of the following:
   duration from previous memory training reaches first preset duration;
   a delay variation detected by a delay detection circuit on a memory chip connected to the processor is greater than a preset variation; and
   duration in which the memory chip connected to the processor is in an idle state reaches second preset duration.

4. The processor according to claim 1,
   wherein the initial training result is a training result obtained by performing memory training on the computer system before current memory training is performed.

5. The processor according to claim 4, wherein the initial training result comprises an initial left boundary and an initial right boundary of the sampling window of the target signal; and
   the first processor core is configured to adjust the timing relationship between the target signal and the synchronization signal through the memory training based on the initial training result by:
   determining the target left boundary of the sampling window of the target signal based on the initial left boundary; and
   determining the target right boundary of the sampling window of the target signal based on the initial right boundary.

6. The processor according to claim 5, wherein the determining the target left boundary of the sampling window of the target signal based on the initial left boundary comprises:
   performing a read/write test of the target signal based on the initial left boundary; and
   based on the read/write test being successful, adjusting the left boundary of the sampling window to the left by a target step length, and performing a read/write test of the target signal based on an adjusted left boundary, until the read/write test fails; and determining a left boundary previous to a left boundary at which the read/write test fails, as the target left boundary of the sampling window.

7. The processor according to claim 5, wherein the determining the target right boundary of the sampling window of the target signal based on the initial right boundary comprises:
   performing a read/write test of the target signal based on the initial right boundary; and
   based on the read/write test being successful, adjusting the right boundary of the sampling window to the right by a target step length, and performing a read/write test of the target signal based on an adjusted right boundary, until the read/write test fails; and determining a right boundary previous to a right boundary at which the read/write test fails, as the target right boundary of the sampling window.

8. The processor according to claim 6, wherein
   the memory physical interface comprises a shadow register corresponding to the target signal and a transition register corresponding to the target signal, and either of the left boundary and the right boundary of the sampling window corresponds to one delay value;

the first processor core is further configured to: before performing each read/write test of the target signal, configure, in the transition register, a delay value corresponding to a boundary of the sampling window based on which a current read/write test is performed; and upon performing each read/write test of the target signal, load the delay value in the transition register into the shadow register; and the first processor core is configured to perform the read/write test of the target signal based on the delay value that is in the shadow register and that corresponds to the boundary of the sampling window upon the current read/write test of the target signal being performed.

9. The processor according to claim 5, wherein
the memory physical interface comprises the shadow register corresponding to the target signal, the initial training result further comprises an initial center position of the sampling window of the target signal, the initial center position corresponds to one delay value, and before the first processor core performs the training operations, the delay value corresponding to the initial center position is in the shadow register; and after determining the target center position of the sampling window of the target signal, the first processor core is further configured to update the delay value in the shadow register by using a delay value corresponding to the target center position.

10. The processor according to claim 5, wherein
after determining the target left boundary and the target right boundary of the sampling window of the target signal, the first processor core is further configured to store, in a non-volatile memory connected to the processor, a delay value corresponding to the target left boundary and a delay value corresponding to the target right boundary.

11. A signal adjustment method, applied to a processor, wherein the processor comprises a memory controller, the memory controller comprises a memory physical interface and a first processor core, the first processor core is connected to the memory physical interface, the processor is comprised in a computer system and the method comprises:
    after the computer system is started and during a running process of the computer system, adjusting, by the first processor core, a timing relationship between a target signal of the memory physical interface and a synchronization signal of the target signal,
    wherein both the target signal and the synchronization signal are signals transmitted by using the memory physical interface, the timing relationship between the target signal and the synchronization signal is adjusted through memory training based on an initial training result, and the memory training comprises determining a target center position of a sampling window of the target signal based on a target left boundary and a target right boundary.

12. The method according to claim 11, wherein
the adjusting the timing relationship between the target signal and the synchronization signal comprises:
after the computer system is started and during the running process of the computer system, based on a training condition being met, adjusting, by the first processor core, the timing relationship between the target signal and the synchronization signal through the memory training.

13. The method according to claim 12, wherein the training condition comprises at least one of the following:

duration from previous memory training reaches first preset duration;

a delay variation detected by a delay detection circuit on a memory chip connected to the processor is greater than a preset variation; and duration in which the memory chip connected to the processor is in an idle state reaches second preset duration.

14. The method according to claim 11, wherein
wherein the initial training result is a training result obtained by performing memory training on the computer system before current memory training is performed.

15. The method according to claim 14, wherein
the initial training result comprises an initial left boundary and an initial right boundary of the sampling window of the target signal; and wherein the adjusting the timing relationship between the target signal and the synchronization signal through the memory training based on the initial training result comprises:
determining the target left boundary of the sampling window of the target signal based on the initial left boundary; and
determining the target right boundary of the sampling window of the target signal based on the initial right boundary.

16. The method according to claim 15, wherein
the determining the target left boundary of the sampling window of the target signal based on the initial left boundary comprises:
performing a read/write test of the target signal based on the initial left boundary; and
based on the read/write test being successful, adjusting the left boundary of the sampling window to the left by a target step length, and performing a read/write test of the target signal based on an adjusted left boundary, until the read/write test fails; and determining a left boundary previous to a left boundary at which the read/write test fails, as the target left boundary of the sampling window.

17. The method according to claim 15, wherein
the determining the target right boundary of the sampling window of the target signal based on the initial right boundary comprises:
performing a read/write test of the target signal based on the initial right boundary; and
based on the read/write test being successful, adjusting the right boundary of the sampling window to the right by a target step length, and performing a read/write test of the target signal based on an adjusted right boundary, until the read/write test fails; and determining a right boundary previous to a right boundary at which the read/write test fails, as the target right boundary of the sampling window.

18. The method according to claim 16, wherein
the memory physical interface comprises a shadow register corresponding to the target signal and a transition register corresponding to the target signal, and either of the left boundary and the right boundary of the sampling window corresponds to one delay value;
the method further comprises:
before performing each read/write test of the target signal, configuring, by the first processor core, in the transition register, a delay value corresponding to a boundary of the sampling window based on which the current read/write test is performed; and upon performing each read/write test of the target signal, loading, by the first processor core, the delay value in the transition register into the shadow register; and wherein the performing the read/write test of the target signal comprises:

performing, by the first processor core, the read/write test of the target signal based on the delay value that is in the shadow register and that corresponds to the boundary of the sampling window upon the current read/write test of the target signal being performed.

19. The method according to claim 15, wherein the memory physical interface comprises the shadow register corresponding to the target signal, the initial training result further comprises an initial center position of the sampling window of the target signal, the initial center position corresponds to one delay value, and before the first processor core performs the training operations, the delay value corresponding to the initial center position is in the shadow register; and the method further comprises:

after determining the target center position of the sampling window of the target signal, updating, by the first processor core, the delay value in the shadow register by using a delay value corresponding to the target center position.

20. A computer system, comprising:

a processor and a memory chip coupled to the processor which comprises a memory controller, wherein the memory controller comprises a memory physical interface and a first processor core, and the first processor core is connected to the memory physical interface; and after the computer system is started and during a running process of the computer system, the first processor core is configured to adjust a timing relationship between a target signal of the memory physical interface and a synchronization signal of the target signal, wherein both the target signal and the synchronization signal are signals transmitted by using the memory physical interface, the timing relationship between the target signal and the synchronization signal is adjusted through memory training based on an initial training result, and the memory training comprises determining a target center position of a sampling window of the target signal based on a target left boundary and a target right boundary.

* * * * *